United States Patent
Heideman et al.

(10) Patent No.: US 12,298,609 B2
(45) Date of Patent: May 13, 2025

(54) INTEGRATED-OPTICS PHASE CONTROLLER HAVING IMPROVED ELECTRODE CONFIGURATION

(71) Applicant: LioniX International BV, Enschede (NL)

(72) Inventors: René Gerrit Heideman, Oldenzaal (NL); Arnoud Sebastiaan Everhardt, Enschede (NL); Jörn Philipp Epping, Münster (DE); Erik Schreuder, Rijssen (NL); Thi Lan Anh Tran, Enschede (NL)

(73) Assignee: LioniX International BV, Enschede (NL)

( * ) Notice: Subject to any disclaimer, the term of this patent is extended or adjusted under 35 U.S.C. 154(b) by 231 days.

(21) Appl. No.: 17/988,653

(22) Filed: Nov. 16, 2022

(65) Prior Publication Data
US 2023/0152608 A1   May 18, 2023

Related U.S. Application Data

(60) Provisional application No. 63/280,877, filed on Nov. 18, 2021.

(51) Int. Cl.
*G02F 1/225* (2006.01)
*G02B 6/122* (2006.01)
*G02F 1/01* (2006.01)

(52) U.S. Cl.
CPC ........... *G02F 1/0134* (2013.01); *G02B 6/122* (2013.01); *G02F 1/225* (2013.01)

(58) Field of Classification Search
CPC .................................................... G02F 1/0134
See application file for complete search history.

(56) References Cited

U.S. PATENT DOCUMENTS

| | | |
|---|---|---|
| 4,684,215 A | 8/1987 | Shaw et al. |
| 6,185,345 B1 | 2/2001 | Singh et al. |
| (Continued) | | |

OTHER PUBLICATIONS

Office Action issued in Korean Patent Application No. 10-2023-7043278, Sep. 13, 2024, 4 pp. w/ translation.
(Continued)

*Primary Examiner* — Rhonda S Peace
(74) *Attorney, Agent, or Firm* — Kaplan Breyer Schwarz, LLP

(57) ABSTRACT

The present Specification is directed to devices for controlling the phase of a light signal in a surface waveguide of a planar-lightwave circuit by controlling a stress in the waveguide material. Phase controllers disclosed can impart stresses of opposite signs in a material such that a desired effect on the refractive index of an optical material can be accentuated. As a result, a greater change in the refractive index of the material can be realized in a phase controller that requires less chip real estate and/or at lower voltages. In some embodiments, a phase-control module includes a pair of complimentary stress-optic phase controllers, one having electrodes disposed on the top and bottom of a piezoelectric layer, while the other has electrodes disposed only on top of the piezoelectric layer. As a result, the phase controllers impart stress of opposite sign in the material beneath them.

9 Claims, 19 Drawing Sheets

(56) References Cited

U.S. PATENT DOCUMENTS

| | | | |
|---|---|---|---|
| 6,453,086 B1* | 9/2002 | Tarazona | G02F 1/3136 |
| | | | 385/20 |
| 9,221,074 B2 | 12/2015 | Heideman et al. | |
| 10,241,352 B2* | 3/2019 | Epping | G02B 6/02076 |
| 10,437,081 B2* | 10/2019 | Epping | G02B 6/29353 |
| 11,852,906 B2* | 12/2023 | Casset | G02F 1/2955 |
| 12,061,384 B2* | 8/2024 | Dekker | G02F 1/212 |
| 2001/0046363 A1 | 11/2001 | Purchase et al. | |
| 2006/0263098 A1 | 11/2006 | Akiyama et al. | |
| 2015/0110441 A1 | 4/2015 | Heideman et al. | |
| 2018/0203262 A1 | 7/2018 | Epping et al. | |
| 2019/0171043 A1 | 6/2019 | Epping et al. | |
| 2022/0365376 A1 | 11/2022 | Dekker et al. | |
| 2023/0152608 A1* | 5/2023 | Heideman | G02B 6/122 |
| | | | 385/3 |
| 2024/0061308 A1 | 2/2024 | Yen et al. | |
| 2024/0353695 A1* | 10/2024 | Dekker | G02F 1/212 |

OTHER PUBLICATIONS

Epping et al., Ultra-low-power stress-based integrated photonic phase actuator, Jun. 27, 2017, XP055653045.

Exner, Karin, International Search Report and Written Opinion issued in PCT Patent Application No. PCT/IB2022/061113 mailed on Feb. 2, 2023.

Tsia et al., Electrical tuning of birefringence in silicon waveguides, Feb. 11, 2008, Applied Physics Letters; XP55571982, vol. 92 / No. 6.

Grigory Lihachev et al., "Ultralow-noise frequency-agile photonic integrated lasers", Jul. 15, 2021, 26 pp.

Notice of Allowance and Fees Due (PTOL-85) Mailed on Jun. 17, 2024 for U.S. Appl. No. 17/743,853, 10 page(s).

* cited by examiner

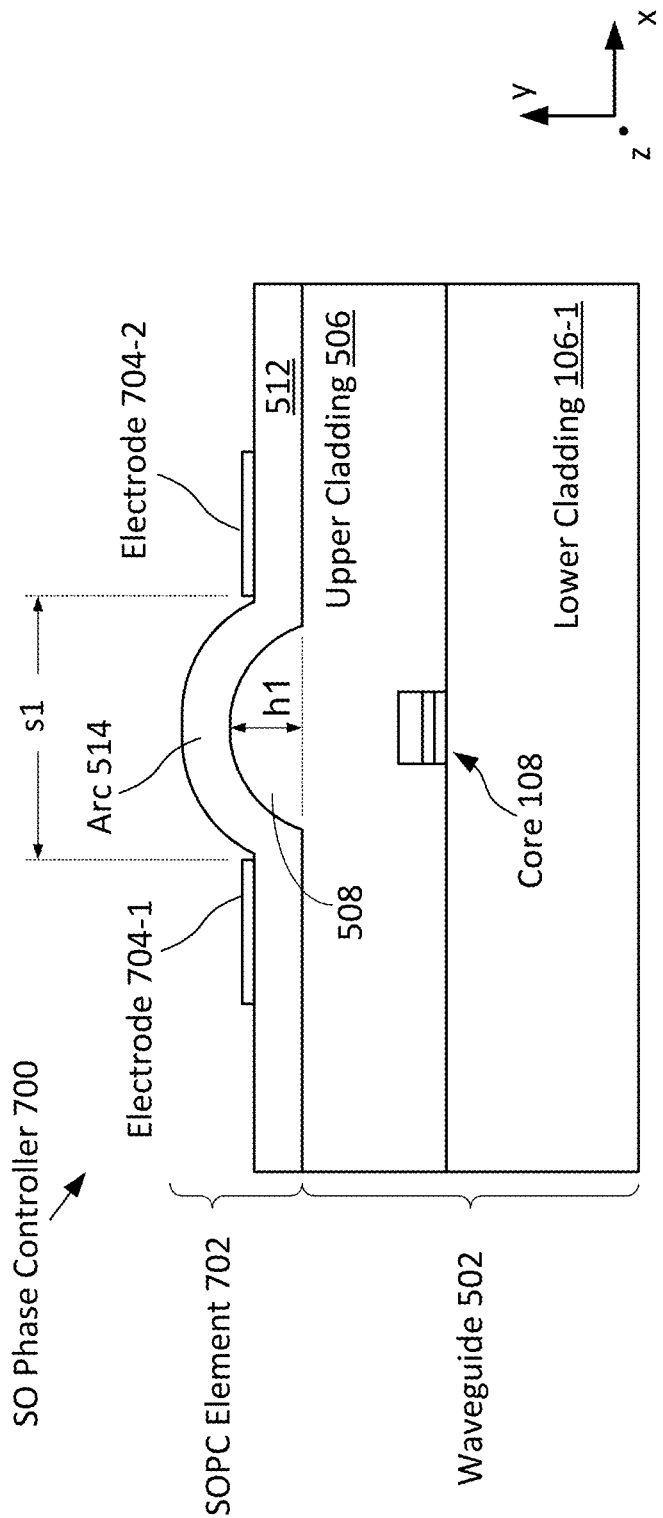

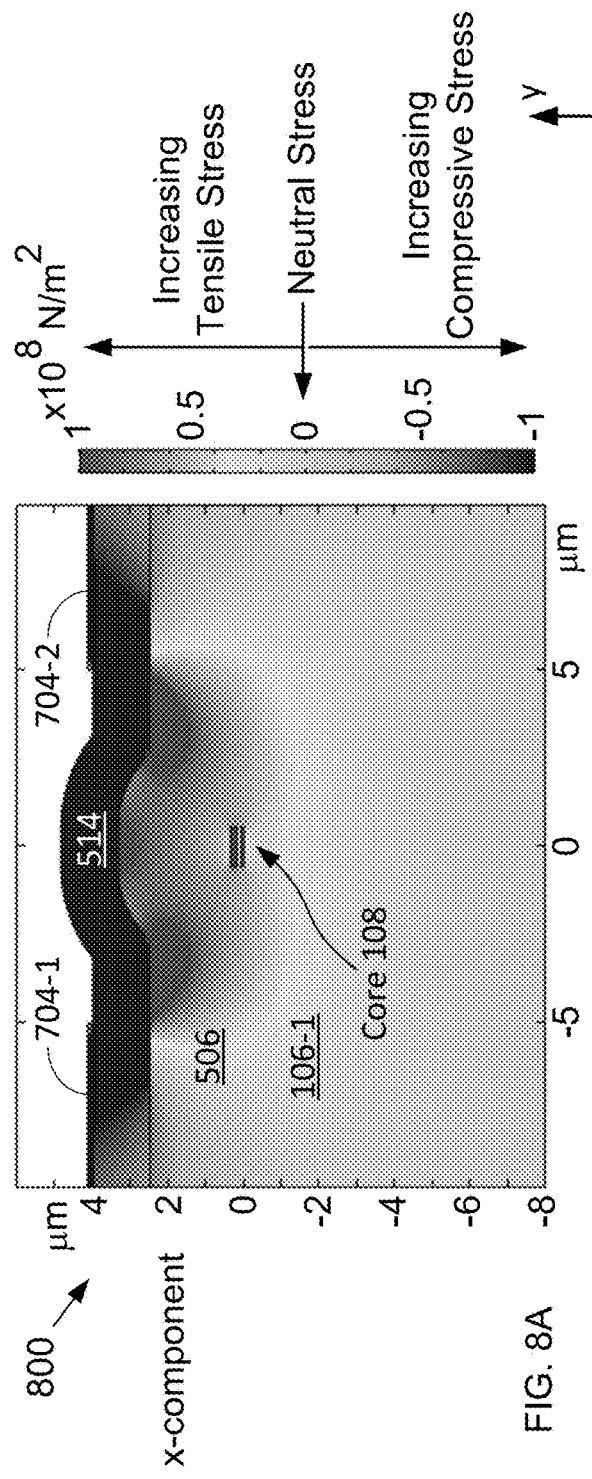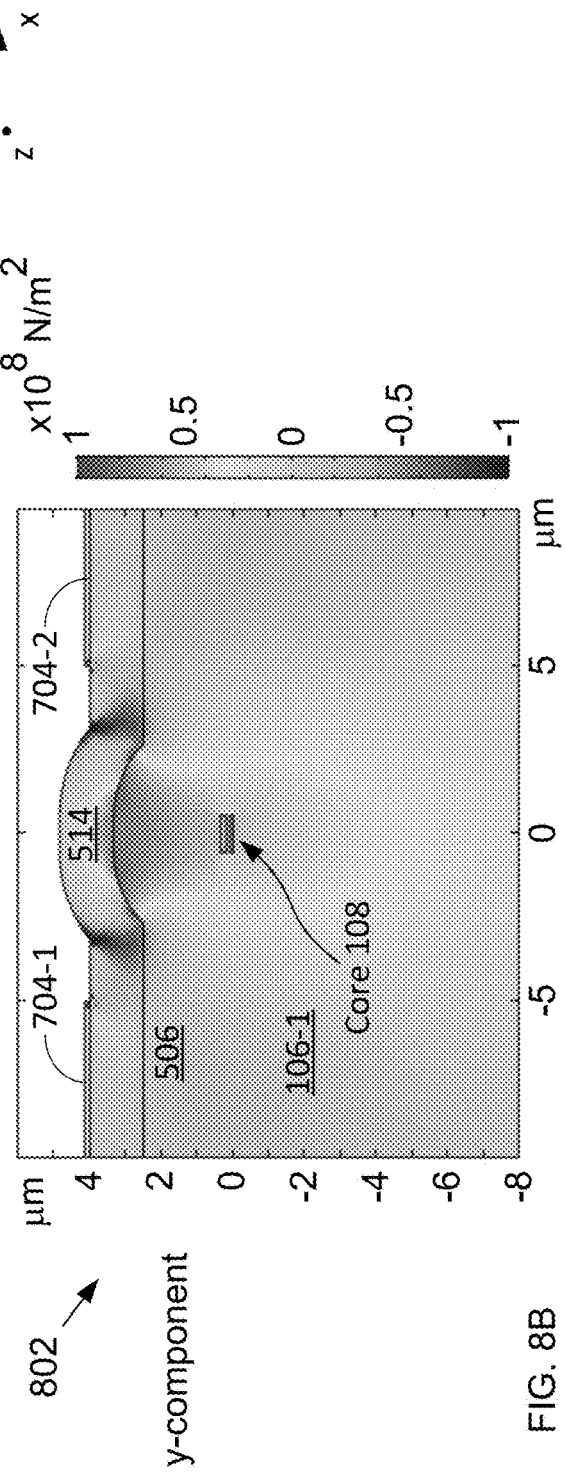
FIG. 8A
FIG. 8B

INTEGRATED-OPTICS PHASE CONTROLLER HAVING IMPROVED ELECTRODE CONFIGURATION

CROSS REFERENCE TO RELATED APPLICATIONS

This application claims the benefit of U.S. Provisional Patent Application Ser. No. 63/280,877, filed Nov. 18, 2021, entitled "Integrated-Optics Phase Controller Having Improved Electrode Configuration,", which is incorporated herein by reference.

TECHNICAL FIELD

The present disclosure relates to integrated optics in general and, more specifically, to devices for controlling the phase of an optical signal propagating in a surface waveguide of a planar waveguide circuit.

BACKGROUND

A Planar Lightwave Circuit (PLC) is an optical system comprising one or more integrated-optics-based waveguides that are integrated on the surface of a substrate, where the waveguides are typically combined to provide complex optical functionality. These "surface waveguides" typically include a core of a first material that is surrounded by a cladding material (or materials) having a refractive index that is lower than that of the first material. The change in refractive index at the interface between the core and cladding gives rise to internal reflection of light propagating through the core, thereby guiding the light along the length of the surface waveguide.

PLC-based devices and systems have made significant impact in many applications, such as optical communications systems, sensor platforms, solid-state projection systems, and the like. Surface-waveguide technology satisfies a need in these systems for small-sized, reliable optical circuit components that can provide functional control over a plurality of optical signals propagating through a system. Examples include simple devices (e.g., 1×2 and 2×2 optical switches, Mach-Zehnder interferometer-based sensors, etc.), as well as more complex, matrix-based systems having multiple surface waveguide elements and many input and output ports (e.g., wavelength add-drop multiplexers, cross-connects, wavelength combiners, etc.).

Common to many such systems is a need for a switching element. Historically, the most common switching elements suitable for use in a PLC are based on a device known as a thermo-optic (TO) phase controller. A TO phase controller takes advantage of the fact that the refractive index (i.e., the speed of light in a material) is temperature-dependent (referred to as the thermo-optic effect) by including a thin-film heater that is disposed on the top of the upper cladding of a surface waveguide. Electric current passed through the heater generates heat that propagates into the cladding and core materials, changing their temperature and, thus, their refractive indices. TO phase controllers have demonstrated induced phase changes greater than $2\pi$ (i.e., 360 degrees).

A TO phase controller can be included in a surface waveguide element, such as a Mach-Zehnder interferometer (MZI), to form an optical switching element. In an MZI switch arrangement, an input optical signal is split into two equal parts that propagate down a pair of substantially identical surface-waveguide paths (i.e., arms) to a junction where they are then recombined into an output signal. One of the arms incorporates a TO phase controller that controls the phase of the light in that arm. By imparting a phase difference of $\pi$ between the light-signal parts in the arms, the two signals destructively interfere when recombined, thereby canceling each other out to result in a zero-power output signal. When the phase difference between the light-signal parts is 0 (or $n*2\pi$, where n is an integer), the two signals recombine constructively resulting in a full-power output signal.

Unfortunately, TO phase controllers are too slow for many applications because waveguide materials are normally not highly thermally conductive (i.e., they typically have low thermal-conductivity coefficients). As a result, the time required to heat or cool a surface waveguide structure can be relatively long (for example, 250 microseconds for a glass-based waveguide). In addition, the power consumption of TO phase controllers is high (>100 mW in a static situation) which requires cooling control elements in the product or limits their usage in low-power environments.

More recently, stress-optic-based phase-tuning capability exploiting the photo-elastic effect has been demonstrated by incorporating a piezoelectric element disposed on a surface waveguide structure. By virtue of the photo-elastic effect, a stress-optic (SO) phase controller can induce a change in the refractive index of the materials of a waveguide with which it is operatively coupled by inducing a stress in the materials, as discussed in, for example, U.S. Pat. Nos. 9,221,074, 9,764,352, and 10,241,352, each of which is incorporated herein by reference.

While SO phase controllers are capable of inducing a $2\pi$ phase shift on an optical signal in as little as a few microseconds and exhibit relatively low static-power consumptions (less than <1 µW, for example), they require higher voltages than thermo-optic phase controllers and significantly greater length over which the stress must be induced in a surface waveguide. For instance, while a thermo-optic phase controller might require an interaction length of approximately 1 mm to induce a $2\pi$ phase shift, the required interaction length for a comparable prior-art SO phase controller might be 2 cm or more.

As a result, a fast, space-efficient, low-power approach to phase control of a light signal propagating in a surface waveguide would be a welcome advance in the state of the art.

SUMMARY

The present disclosure is directed toward photonic systems that include stress-optic phase controllers that require low drive voltage and/or require small chip real estate. Embodiments in accordance with the present disclosure are particularly well suited for use in systems such as microwave photonics, LiDAR and the like.

The present disclosure provides an advance over the prior art by exploiting a heretofore unrecognized property of a stress-optic phase controller—namely, that it can impart stresses of opposite signs in a material such that a desired effect on the refractive index of an optical material can be accentuated and, in some cases, substantially optimized. As a result, a greater change in the refractive index of the material can be realized.

Like stress-optic-phase-controller-based photonic systems known in the prior art, a refractive index change in a waveguide is induced by imparting a stress on the waveguide material via a piezoelectric element disposed on top of the waveguide. However, in sharp contrast to the prior art, systems in accordance with the present disclosure are configured to induce stresses having opposite signs at different locations in a photonic system.

An illustrative embodiment is a photonics circuit comprising an integrated-optics-based asymmetric Mach-Zehnder Interferometer that is configured as an optical switch. The aMZI includes a pair of arms having different lengths, where each arm includes a stress-optic phase controller. One stress-optic phase controller is configured to induce positive stress in the waveguide material beneath it, while the other stress-optic phase controller is configured to induce negative stress in the waveguide material beneath it. As a result, the two stress-optic phase controllers operate in a "push-pull" operational mode that significantly reduces the amount of stress that must be induced to realize a relative $2\pi$ phase shift between light signals propagating in the two arms.

In some embodiments, a photonic system includes an MZI having arms of equal length, upon which are disposed stress-optic phase controllers configured to induce stress of opposite signs in the arms.

In some embodiments, a single stress-optic phase controller is operatively coupled with a single waveguide to induce a stress of a desired sign in the waveguide.

In some embodiments, a stress-optic phase controller is disposed on a planarized waveguide structure.

In some embodiments, a stress-optic phase controller is disposed on a waveguide structure characterized by a dome or projection included in its upper cladding, which gives rise to an enhanced stress level in the waveguide materials.

In some embodiments, a stress-optic phase controller comprises at least one electrode whose shape is configured to give rise to an enhanced stress level in the waveguide materials.

An embodiment in accordance with the present disclosure is an apparatus comprising a planar lightwave circuit (900) including: a first surface waveguide (910B) that includes a first core (108B) and a first cladding (506) that is at least partially disposed on the first core; and a phase-control module (904) that includes a first stress-optic phase-control (SOPC) element (916B) comprising: (i) a first piezoelectric layer (512) disposed on the first cladding, the first piezoelectric layer having a first surface (516-1) that is proximal to the first cladding and a second surface (516-2) that is distal to the first cladding; (ii) a first electrode (918-1); and (iii) a second electrode (918-3); wherein the first electrode is in physical and electrical contact with the second surface; and wherein the second electrode is in physical and electrical contact with one of the first surface and second surface; wherein the phase-control module is configured to induce a first stress in the first surface waveguide in response to a first control signal (CSB) applied to the first and second electrodes.

Another embodiment in accordance with the present disclosure is a method comprising: providing a first surface waveguide (910B) that includes a first core (108B) and a first cladding (506) that is at least partially disposed on the first core; providing a phase-control module (904) that includes a first stress-optic phase-control (SOPC) element (916B) that is operatively coupled with the first surface waveguide, the first SOPC element comprising: (i) a first piezoelectric layer (512) disposed on the first cladding, the first piezoelectric layer having a first surface (516-1) that is proximal to the first cladding and a second surface (516-2) that is distal to the first cladding; (ii) a first electrode (918-1); and (iii) a second electrode (918-3); wherein the first electrode is in physical and electrical contact with the second surface; wherein the second electrode is in physical and electrical contact with one of the first surface and second surface; and wherein phase-control module is configured to induce a first stress in the first surface waveguide in response to a first control signal (CSB) applied to the first and second electrodes; enabling propagation of a first light signal (914B) through the first waveguide; and controlling a first phase of the first light signal by controlling the first control signal.

BRIEF DESCRIPTION OF THE DRAWINGS

FIG. 7 depicts a schematic drawing of a cross-sectional view of a domed SO phase controller having a top-top electrode configuration in accordance with the present disclosure.

FIGS. 8A-B show simulation results for the x- and y-components, respectively, of stress fields developed throughout the structure of waveguide 502 in response to a voltage applied to electrodes 510-1 and 510-2.

DETAILED DESCRIPTION

It is an aspect of the present disclosure that a piezoelectric element disposed on the top cladding of an integrated-optics waveguide creates different regions within the waveguide material that are characterized by stresses of opposite signs. For example, application of stress on the waveguide structure results not only in high compressive or tensile stress in the waveguide directly under the electrode, but also in a smaller, opposite stress at a certain distance away from the electrodes.

It is another aspect of the present disclosure that such a stress distribution can be exploited by arranging one or more waveguides relative to the distribution to induce different phase changes in the different waveguides.

Furthermore, it is yet another aspect of the present disclosure that the distribution of these stresses can be controlled by the configuration of the electrodes of the piezoelectric element.

As would be apparent to one skilled in the art, highly piezoelectric materials produce a single stress direction (compressive or tensile) independent of the sign of the applied electric field due to the operation above the coercive field. In some SO phase controllers in accordance with the present disclosure, however, opposite stress is realized by controlling the direction of the electric field through electrode design, from vertical in a top-bottom configuration to horizontal in a top-top configuration.

Figure 1:
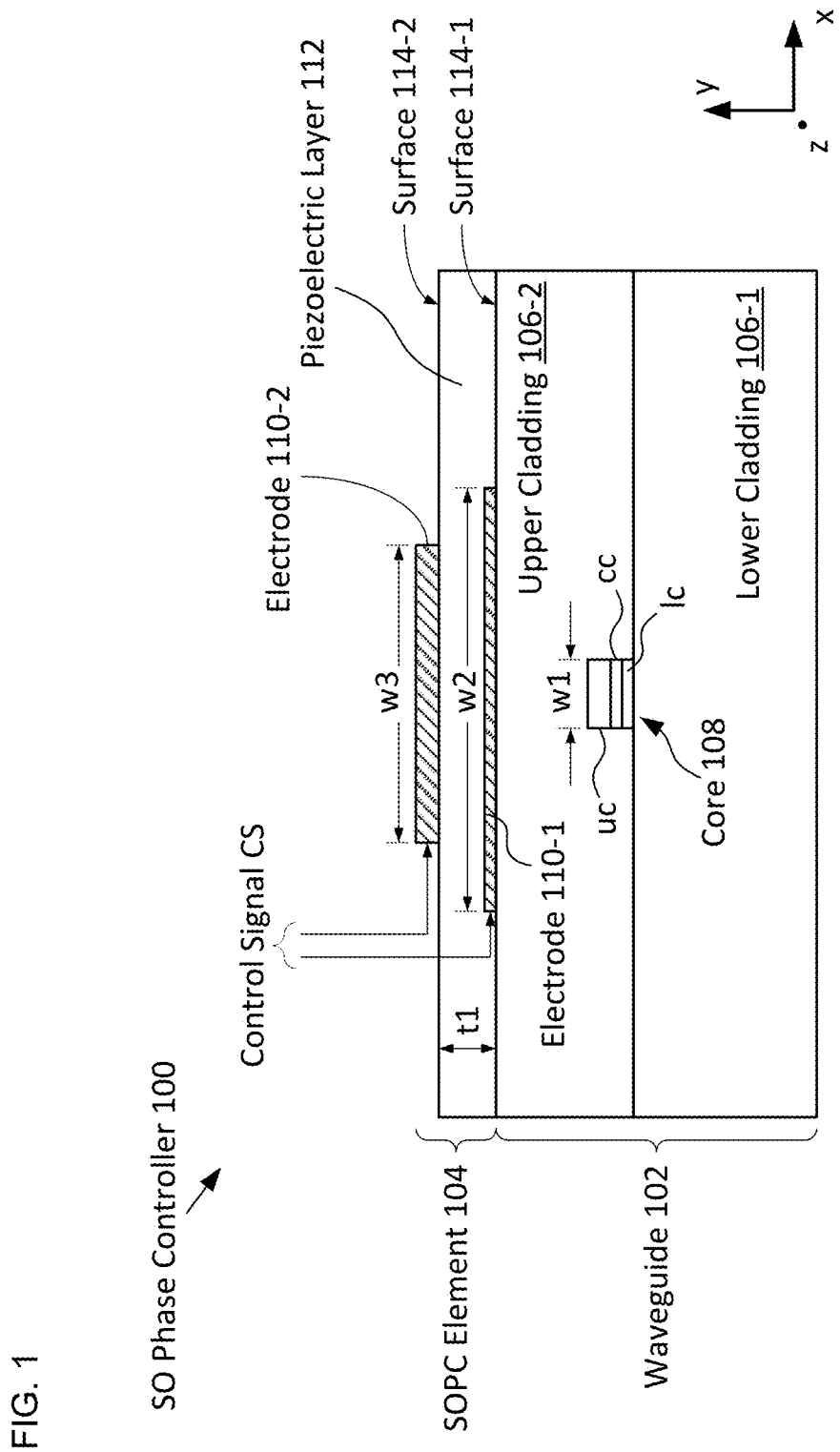
FIG. 1 depicts a cross-sectional view of a stress-optic (SO) phase controller that includes an SO phase element having a top-bottom electrode configuration in accordance with the present disclosure.

FIG. 1 depicts a cross-sectional view of a stress-optic (SO) phase controller that includes an SO phase element having a top-bottom electrode configuration in accordance with the present disclosure.

Phase controller 100 includes waveguide 102 and stress-optic phase-control (SOPC) element 104, which is disposed on the top surface of the waveguide. As will be apparent to one skilled in the art, waveguide 102 is disposed on a suitable substrate (not shown), such as a silicon wafer, compound semiconductor wafer, glass substrate, or myriad alternative substrates suitable for use in planar-processing fabrication.

Waveguide 102 is an integrated-optics-based waveguide that includes lower cladding 106-1, core 108, and upper cladding 106-2. In the depicted example, each of lower cladding 106-1 and upper cladding 106-2 is a layer of silicon dioxide having thicknesses of 8 microns and 3 microns, respectively. It should be noted that a wide range of thicknesses for a lower and/or upper cladding can be used without departing from the scope of the present disclosure. In the depicted example, upper cladding 106-2 is planarized via a process such as chemical-mechanical polishing. As discussed below, however, the teachings of the present disclosure are also applicable to non-planarized waveguide structures.

In the depicted example, waveguide 102 is an asymmetric double-stripe (ADS) TriPleX™ waveguide comprising core 108, which has width, w1. Core 108 comprises comprising lower core lc, central core cc, and upper core uc. In the depicted example, w1 is approximately 1 micron, and lower core lc, central core cc, and upper core uc have thicknesses of 75 nm, 100 nm, and 175 nm, respectively. However, a wide range of widths and thicknesses can be used for any of lower core lc, central core cc, and upper core uc without departing from the scope of the present disclosure.

Although the depicted example is a multi-core ADS waveguide, the teachings of the present disclosure are applicable to virtually any waveguide structure, such as single-core waveguides comprising any suitable core material (e.g., silicon, doped silicon oxide, silicon oxynitride, silicon-nitride, compound semiconductor, etc.), multi-core symmetric waveguides comprising any combination of suitable core materials (e.g., silicon, doped silicon oxide, silicon oxynitride, silicon-nitride, compound semiconductor, etc.), and the like. Some non-limiting examples of waveguide structures particularly suitable for use in embodiments in accordance with the present disclosure are described in more detail in U.S. Pat. Nos. 7,146,087, 7,142,759, 9,221,074 and 9,764,352, each of which is incorporated herein by reference.

SOPC element 104 is a "top-bottom" stress-optic phase-control element comprising bottom electrode 110-1, piezoelectric layer 112, and top electrode 110-2, where the bottom electrode is in physical and electrical contact with bottom surface 114-1 of piezoelectric layer 112 and the top electrode is in physical and electrical contact with top surface 114-2 of piezoelectric layer 112.

In the depicted example, electrodes 110-1 and 110-2 comprise platinum and have thicknesses of 100 nm and 300 nm, respectively, while piezoelectric layer 112 comprises lead zirconate titanate (PZT) and has a thickness, t1, of 1.5 microns. The widths, w2 and w3, of bottom and top electrodes 110-2 and 110-2 are 10 microns, and the electrodes are aligned with core 108. In some embodiments, w2 is much greater than w3 and, in some cases, extends across the entire chip on which SO phase controller 100 resides. It should be noted that the materials and dimensions provided above are merely exemplary and that any suitable materials and thicknesses can be used for any of bottom electrode 110-1, piezoelectric layer 112, and top electrode 110-2 without departing from the scope of the present disclosure. Furthermore, many alternative materials are suitable for use in piezoelectric layer 112 such as, without limitation, barium titanate, lead titanate, lithium niobate, bismuth ferrite, sodium niobate, and the like.

Figure 2A:
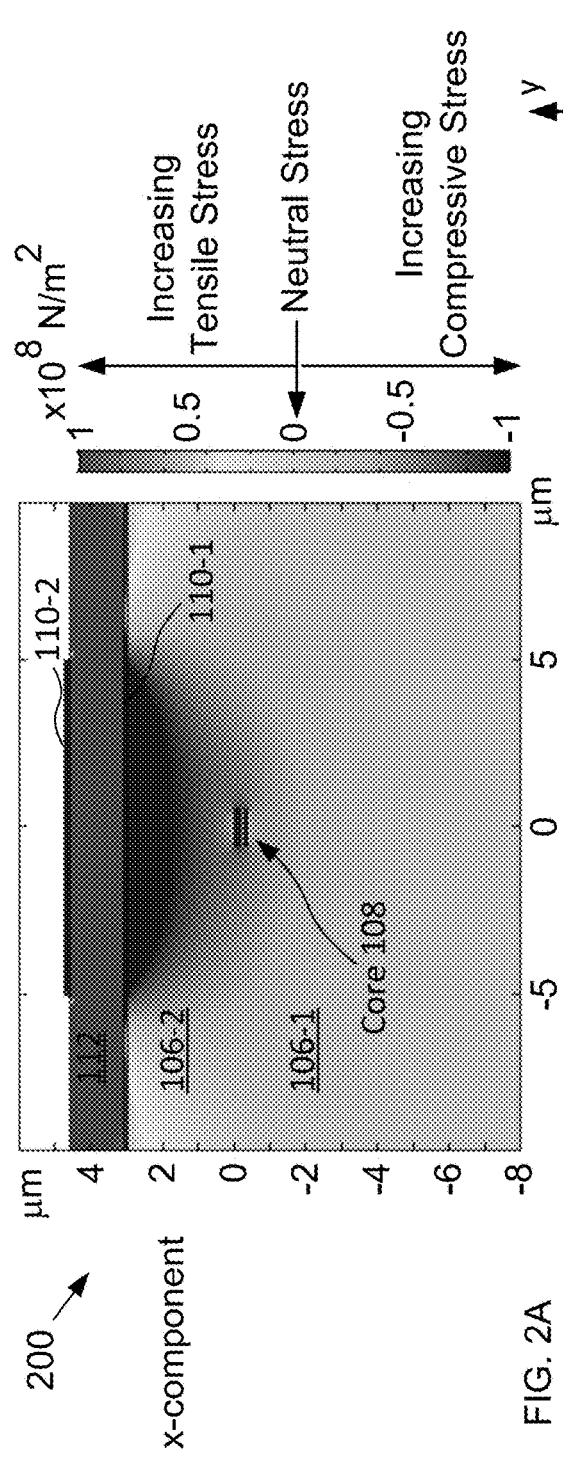
FIGS. 2A-B depict simulations showing the x- and y-components, respectively, of stress fields developed throughout the structure of waveguide 102 in response to a voltage applied to electrodes 110-1 and 110-2.
Figure 2B:
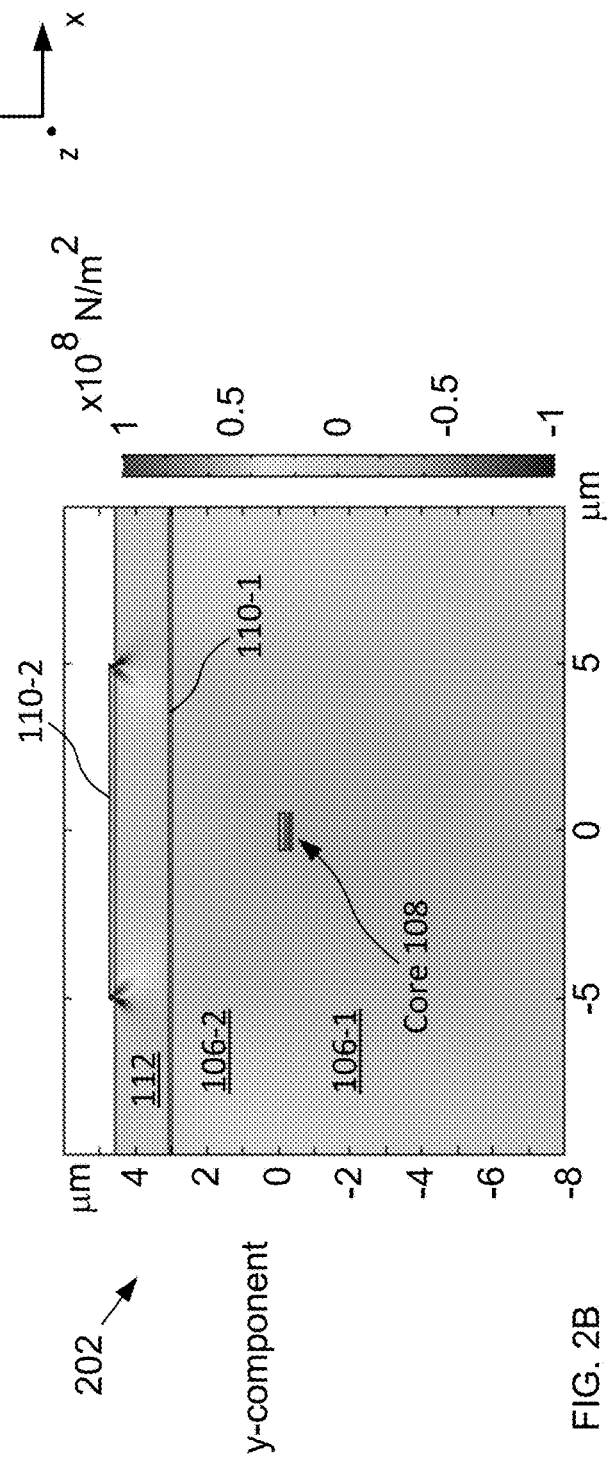

FIGS. 2A-B depict simulations showing the x- and y-components, respectively, of stress fields developed throughout the structure of waveguide 102 in response to a control signal applied to electrodes 110-1 and 110-2.

In response to a voltage (i.e., control signal CS) applied to electrodes 110-1 and 110-2, piezoelectric layer 112 attempts to elongate in the direction of the resultant electric field (y-direction). In addition, due to volume conservation in the piezoelectric layer (with the Poisson ratio), it contracts perpendicular (x- and z-directions) to this electric field. In the depicted example, therefore, elongation of piezoelectric layer 112 in the y-direction gives rise to compressive stress in the waveguide material below it in all three directions. For the purposes of this Specification, a compressive stress in a material is designated as a negative stress, while a tensile stress in a material is designated as a positive stress.

As plots 200 and 202 show, an SOPC element having a top-bottom electrode configuration induces significant compressive stress into the upper cladding and core layers of a waveguide structure on which it is disposed.

On the other hand, it is an aspect of the present disclosure that, by changing the configuration of the electrodes of an SOPC element, a different stress configuration throughout a waveguide on which it is disposed can be achieved.

Figure 3:
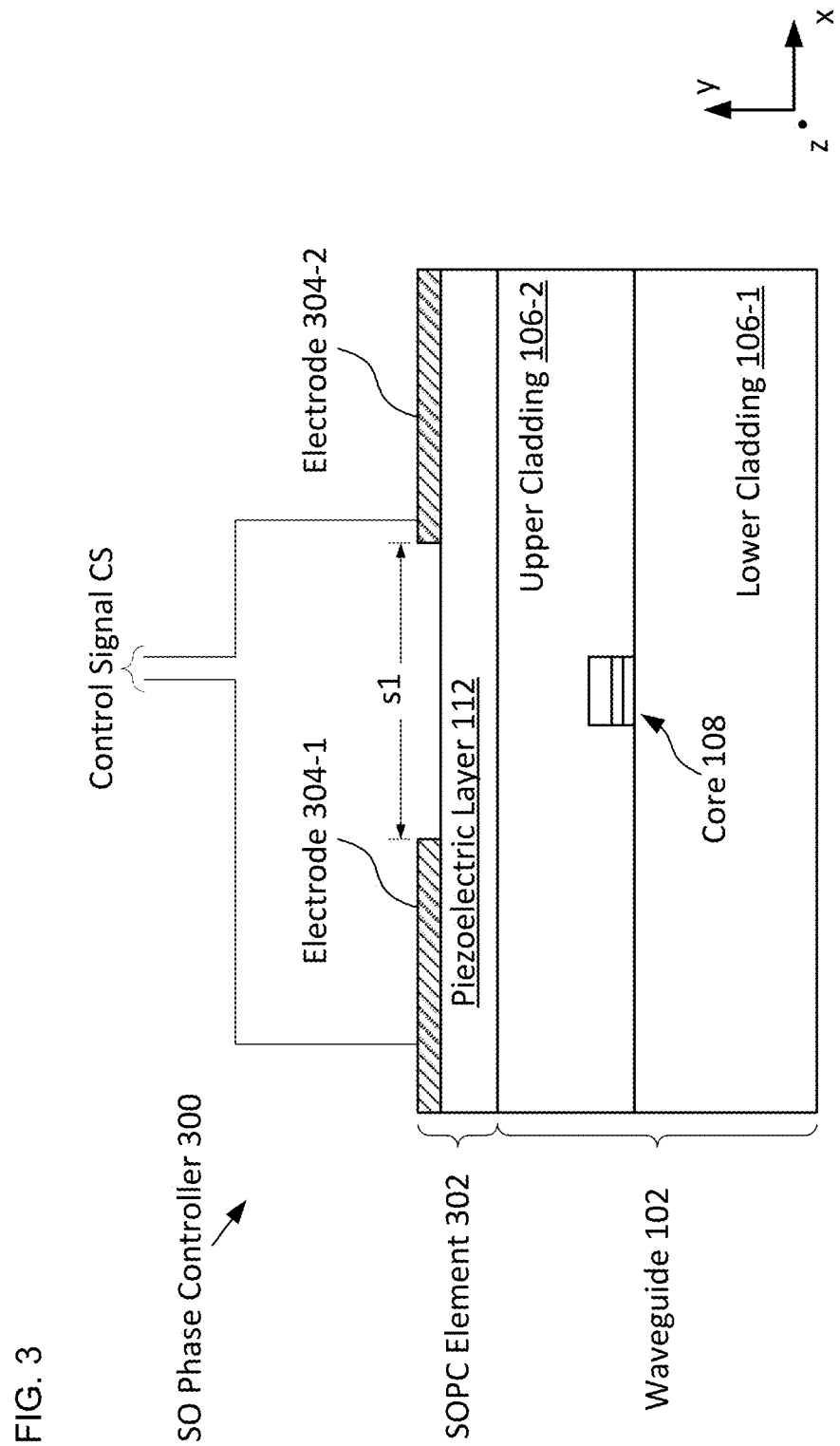
FIG. 3 depicts a cross-sectional view of a stress-optic phase controller that includes an SOPC element having a top-top electrode configuration in accordance with the present disclosure.

FIG. 3 depicts a cross-sectional view of a stress-optic phase controller that includes an SOPC element having a top-top electrode configuration in accordance with the present disclosure.

Phase controller 300 includes waveguide 102 and SOPC element 302, which is disposed on upper cladding 106-2.

SOPC element 302 is a "top-top" stress-optic phase-control element comprising electrodes 304-1 and 304-2, which are in physical and electrical contact with top surface 114-2 of piezoelectric layer 112. In the depicted example, each of electrodes 304-1 and 304-2 comprises platinum and has a width of 10 microns and a thickness of 300 nm. The separation, s1, between electrodes 304-1 and 304-2 is approximately 10 microns.

Figure 4A:
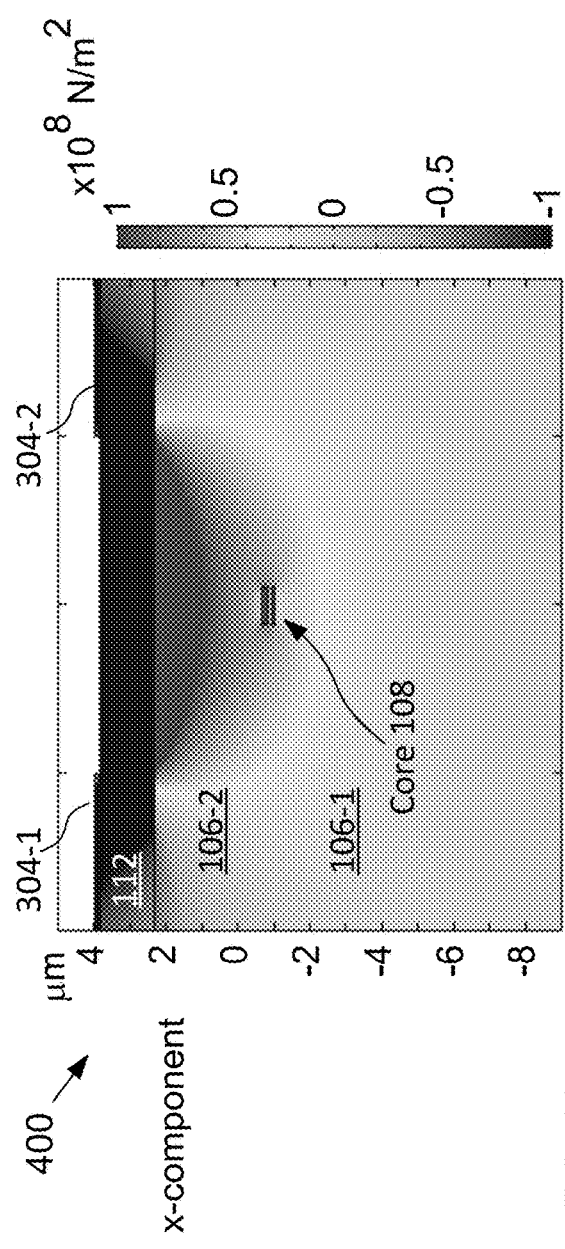
FIGS. 4A-B depict simulations showing the x- and y-components, respectively, of stress fields developed throughout the structure of waveguide 102 in response to a voltage applied to electrodes 304-1 and 304-2.
Figure 4B:
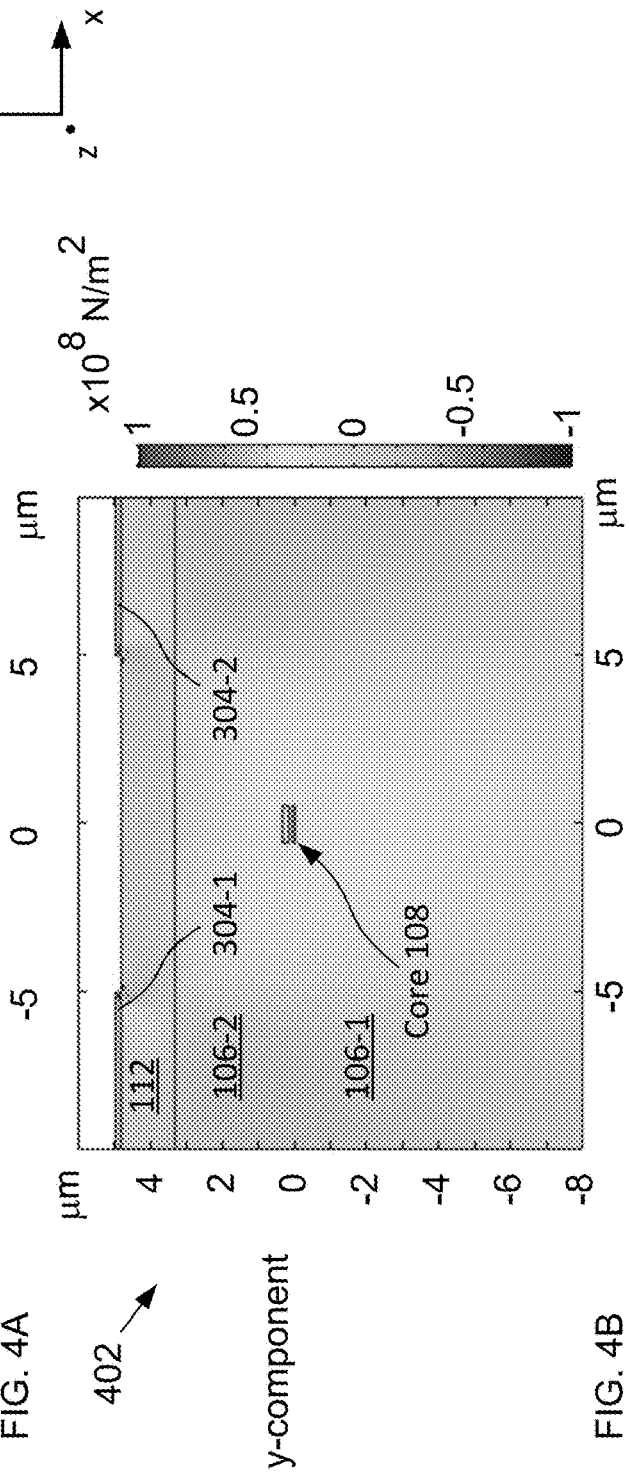

FIGS. 4A-B depict simulations showing the x- and y-components, respectively, of stress fields developed throughout the structure of waveguide 102 in response to a voltage applied to electrodes 304-1 and 304-2.

As noted above, in response to the application of control signal CS to electrodes 304-1 and 304-2, piezoelectric layer 112 attempts to elongate in the direction of the resultant electric field. In the depicted example, therefore, elongation of piezoelectric layer 112 in the x-direction gives rise to tensile stress in the waveguide material below it as it pulls the material along the x-direction. In addition, due to volume conservation in the piezoelectric layer (with the Poisson ratio), it contracts perpendicular (y- and z-directions) to this electric field. Therefore, the waveguide material is pulled along all three directions.

As evinced by plots 400 and 402, a stress-optic phase-control element having a top-top electrode configuration induces significant tensile stress into the upper cladding and core layers of a waveguide structure on which it is disposed.

It should be noted that each of SOPC elements 104 and 302 is formed on a waveguide structure that has been planarized via chemical-mechanical polishing (CMP) such that its upper cladding is flat. As a result, electrodes 110-1, 110-2, 304-1, and 304-2 are also flat.

In some embodiments, however, an SOPC element is disposed on a waveguide structure whose upper cladding includes a dome-like projection above its core. Waveguides having an upper cladding comprising a core, and their fabrication, are described in detail in U.S. Pat. No. 10,241,352, which is incorporated herein by reference. Such a configuration gives rise to a SOPC element whose electrodes and piezoelectric element are shaped such that they conform to the shape of the dome. As a result, the stresses induced in the underlying waveguide materials when the SOPC element is actuated are enhanced compared to the planar waveguide configuration.

Figure 5:
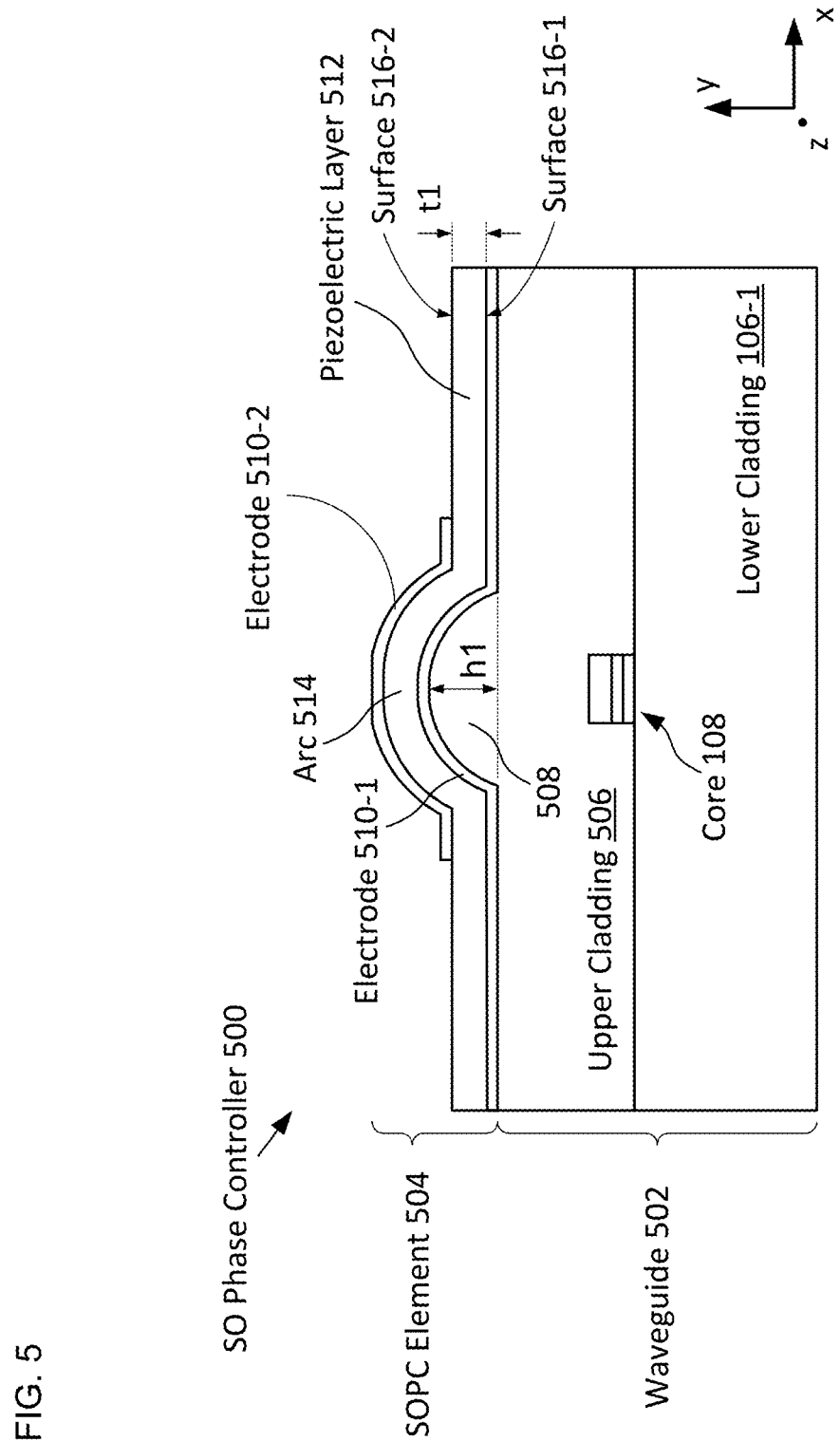
FIG. 5 depicts a schematic drawing of a cross-sectional view of a domed SO phase controller having a top-bottom electrode configuration in accordance with the present disclosure.

FIG. 5 depicts a schematic drawing of a cross-sectional view of a domed SO phase controller having a top-bottom electrode configuration in accordance with the present disclosure. SO phase controller 500 comprises waveguide 502 and SOPC element 504, which is disposed on the top surface of waveguide 502 (i.e., on upper cladding 506).

Waveguide 502 is analogous to waveguide 102; however, in waveguide 502, upper cladding 506 includes dome 508, which is aligned with core 108. In the depicted example, height, h1, of dome 508 is equal to 850 nm.

SOPC element 504 is disposed on dome 508, thereby creating curved piezoelectric layer 512 having arc 514, which is between curved electrodes 510-1 and 510-2, which are in physical and electrical contact with surfaces 516-1 and 516-2, respectively, of piezoelectric layer 512.

SOPC element 504 is analogous to SOPC element 104 described above; however, the shape of SOPC element 504 increases the effectiveness with which it creates stress in the waveguide layers of the waveguide on which it is disposed.

It should be noted that, although electrode 510-1 extends across the entire width of SO phase controller 500 in the depicted example, in some embodiments, electrode 510-1 has a width that is equal to or slightly greater than the width of electrode 510-2.

Figure 6A:
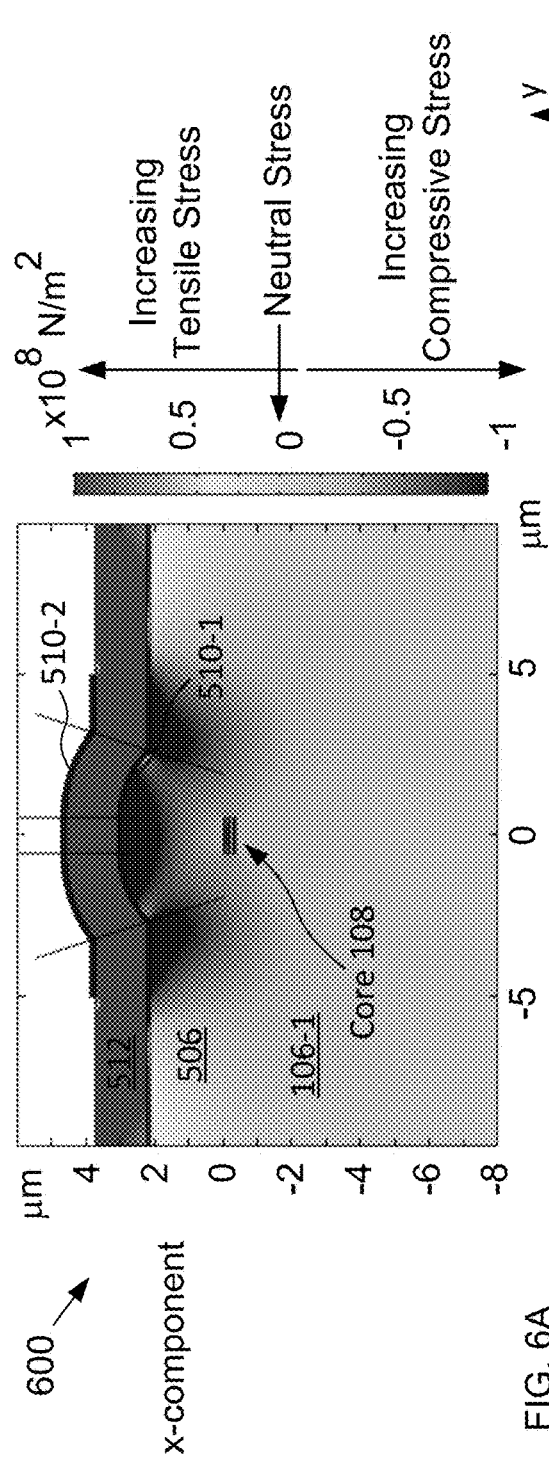
FIGS. 6A-B depict simulations showing the x- and y-components, respectively, of stress fields developed throughout the structure of waveguide 502 in response to a voltage applied to electrodes 510-1 and 510-2.
Figure 6B:
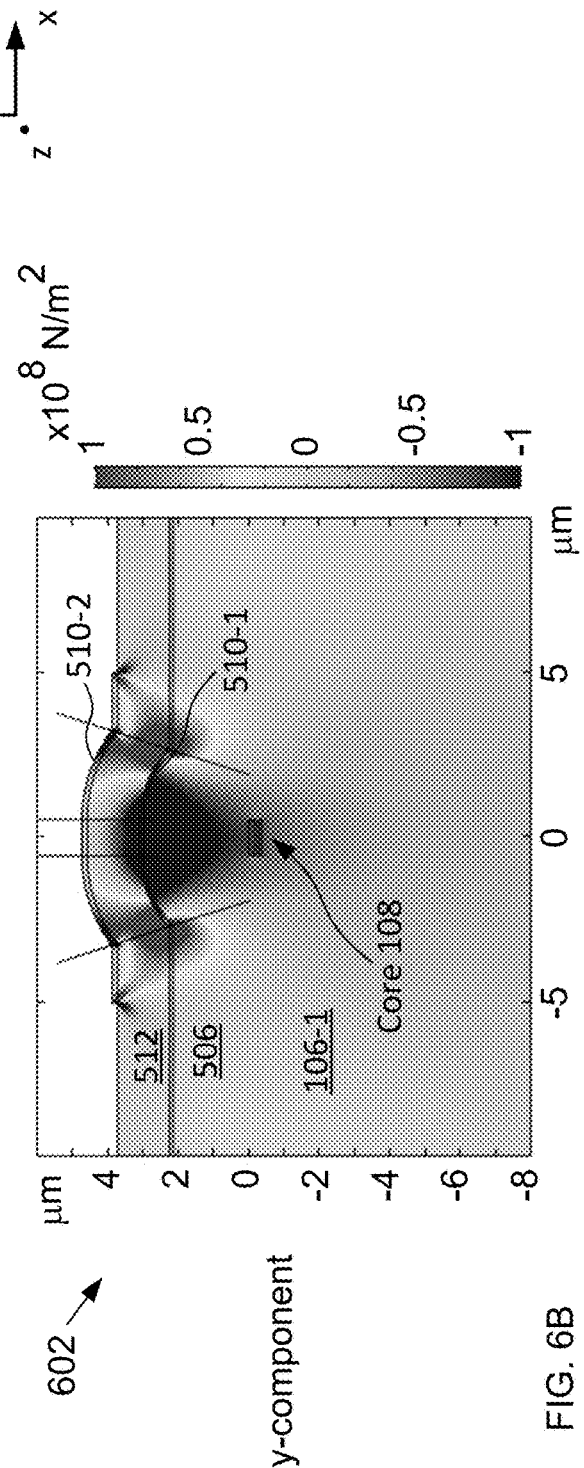

FIGS. 6A-B depict simulations showing the x- and y-components, respectively, of stress fields developed throughout the structure of waveguide 502 in response to a voltage applied to electrodes 510-1 and 510-2.

As see from plots 600 and 602, the magnitude of stress induced in the layers of waveguide 502 by domed SOPC element 504 is significantly greater than that induced in the layers of waveguide 102 by SOPC element 100.

FIG. 7 depicts a schematic drawing of a cross-sectional view of a domed SO phase controller having a top-top electrode configuration in accordance with the present disclosure. SO phase controller 700 comprises waveguide 502 and SOPC element 702, which is disposed on the top surface of waveguide 502.

SOPC element 702 is analogous to SOPC element 504; however, SOPC element 702 includes electrodes 704-1 and 704-2, which are both disposed on the top surface of piezoelectric layer 512 and arranged adjacent to arc 514 such that the arc is located between them.

It should be noted that dome height, h1, has a significant impact on the magnitude of stress that an SOPC element imparts, for both the top-bottom electrode configuration and the top-top electrode configuration. Generally, for either electrode configuration, the greater the value of h1, the more effectively an SOPC element can induce stress in a waveguide structure beneath it, as indicated in Table 1 below.

TABLE 1

Simulation results for the induced optical phase shifts of an optical signal propagating through SO phase controllers 500 and 700 having 1-cm electrode lengths, using applied actuation voltages of 40 V and 200 V, respectively.

| Device | h1 = 0 nm (planar) | h1 = 450 nm | h1 = 950 nm |
|--------|--------------------|-------------|-------------|
| 500    | $1.7\pi$           | $2.3\pi$    | $2.7\pi$    |
| 700    | $1.6\pi$           | $1.8\pi$    | $2.0\pi$    |

FIGS. 8A-B show simulation results for the x- and y-components, respectively, of stress fields developed throughout the structure of waveguide 502 in response to a voltage applied to electrodes 510-1 and 510-2.

Comparing plots 800 and 802 to plots 400 and 402, it is readily apparent that the magnitude of stress induced in the layers of waveguide 502 by domed SOPC element 702 is significantly greater than that induced in the layers of waveguide 102 by SOPC element 300.

Although it is an aspect of the present disclosure that individual SOPC elements can be provided with an electrode configuration suitable for imparting whatever desired type of strain (i.e., tensile or compressive) into the materials of a single waveguide, it is yet another aspect that combinations of SOPC elements having different electrode configurations can be used in concert to generate complicated and, in some embodiments, complimentary strain fields in a planar lightwave circuit including one or more waveguides.

Figure 9A:
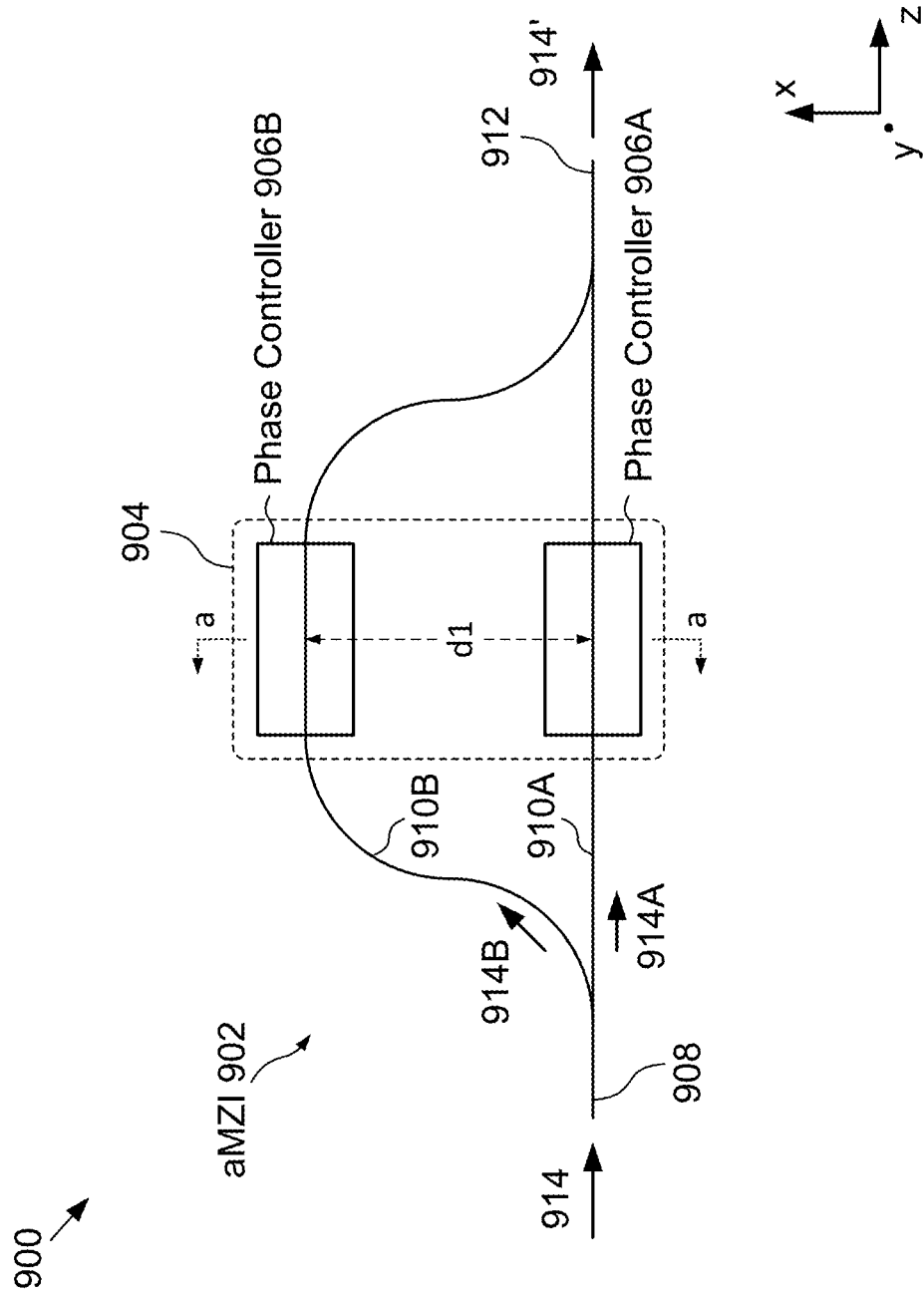
FIG. 9A depicts a schematic drawing of a top view of a PLC-based switch comprising complimentary SO phase controllers in accordance with the present disclosure.

FIG. 9A depicts a schematic drawing of a top view of a PLC-based switch comprising complimentary SO phase controllers in accordance with the present disclosure. PLC 900 includes asymmetric Mach-Zehnder interferometer (aMZI) 902 and phase-control module 904, which are arranged to define an integrated-optics waveguide switch in which the intensity of a light signal is controlled by phase-control module 904 as the light signal passes from the input port of aMZI 902 to the output port of aMZI 902.

Figure 9B:
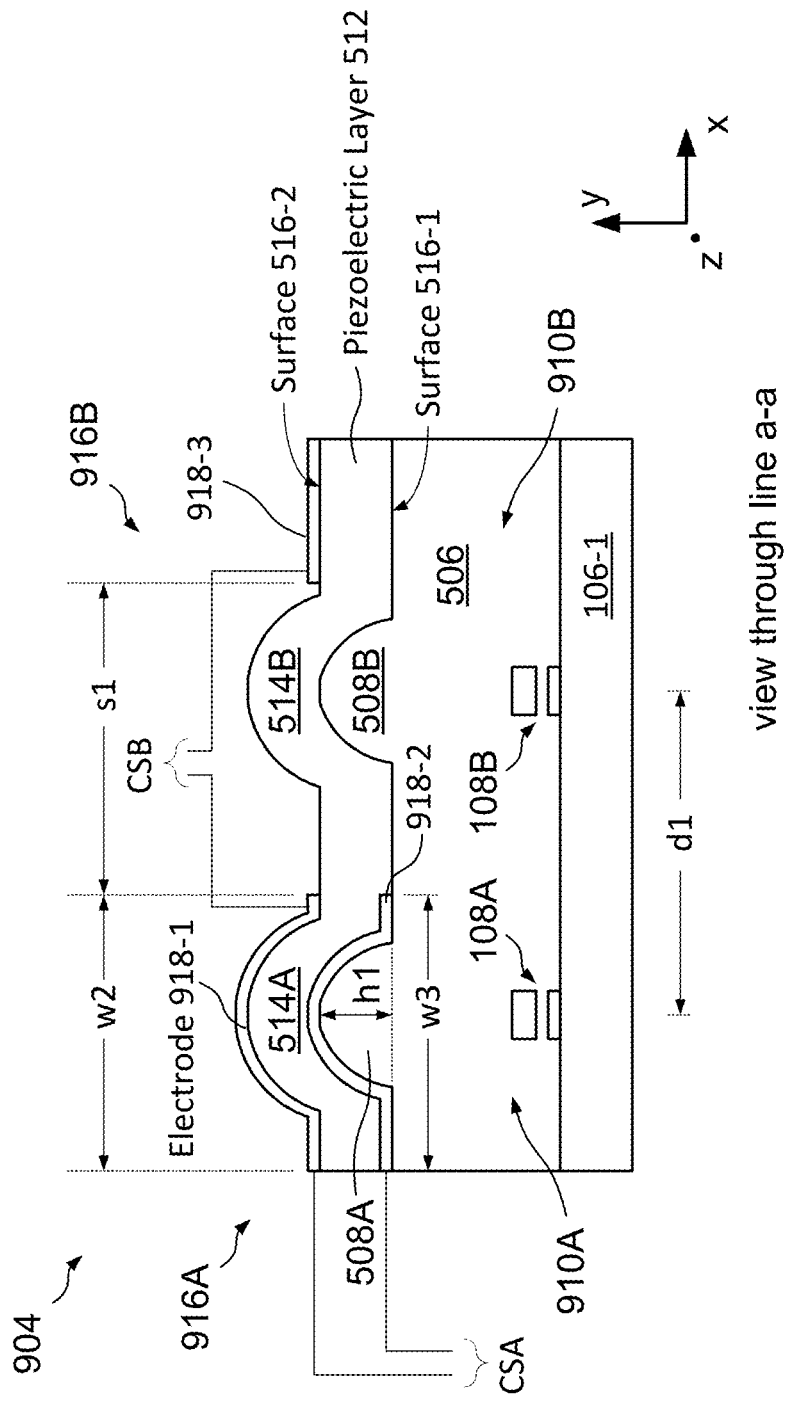
FIG. 9B depicts a schematic drawing of a sectional view of phase-control module 904.

FIG. 9B depicts a schematic drawing of a sectional view of phase-control module 904. The sectional view shown in FIG. 9B is taken through line a-a shown in FIG. 9A.

aMZI 902 is a network of waveguides arranged to define input port 908, arms 910A and 910B, and output port 912. Each of the waveguides of aMZI 902 is analogous to waveguide 502 described above, having a domed upper cladding of height, h1. In addition, the centers of arms 910A and 910B are separated by distance, d1, at phase controller 906B. In the depicted example, h1 is 850 nm and d1 is 10 microns; however, any suitable value can be used for one or both of h1 and d1.

As noted above, although the examples described herein comprise multi-core ADS waveguides, embodiments in accordance with the present disclosure can include waveguides having any suitable waveguide structure.

Phase-control module 904 includes phase controllers 906A and 906B, which include arms 910A and 910B, respectively.

Phase controller 906A is analogous to SO phase controller 500, described above and with respect to FIGS. 5 and 6A-B. Phase controller 906A includes SOPC element 916A disposed on arm 910A. SOPC element 916A includes electrodes 918-1 and 918-2 and the portion of piezoelectric layer 512 that resides between them. In the depicted example, electrodes 918-1 and 918-2 have widths w2 and w3, respectively, of 10 microns.

Phase controller 906B is analogous to SO phase controller 700, described above and with respect to FIGS. 7 and 8A-B. SO phase controller 906B includes SOPC element 916B disposed on arm 910B. SOPC element 916B includes electrodes 918-1 and 918-3 and the portion of piezoelectric layer 512 disposed beneath and between them. In the depicted example, the separation, s1, between electrodes 918-1 and 918-3 is 10 microns.

In operation light signal 914 is split into two equal light portions, 914A and 914B, which propagate through arms 910A and 910B, respectively. After travelling through arms 910A and 90B, light portions 914A and 914B recombine at output port 912. As will be apparent to one skilled in the art, the optical power of recombined optical signal 914' is based on the phase difference between light portions 914A and 914B when they recombine.

The phase difference between light portions 914A and 914B is determined by the difference in the lengths of arms 910A and 910B plus any phase changes induced on the light portions by phase controllers 906A and 906B in response to control signals CSA and CSB, respectively.

Refractive index is a function of material stress and, therefore, it can be increased or decreased by raising or lowering material stress. Since phase-control elements 906A and 906B are configured to induce opposite signs of stress, as discussed above, opposite changes in refractive index can be induced in arms 910A and 910B. Therefore, the teachings of the present disclosure enable a significantly greater phase difference to be imparted on light portions 914A and 914B by inducing opposite phase changes in the two arms. As a result, phase-control module 904 can induce up to a $2\pi$ phase change on light portions 914A and 914B required for full switching functionality in PLC 900 with significantly shorter interaction lengths and requires dramatically less chip real estate than prior-art systems.

Figure 10A:
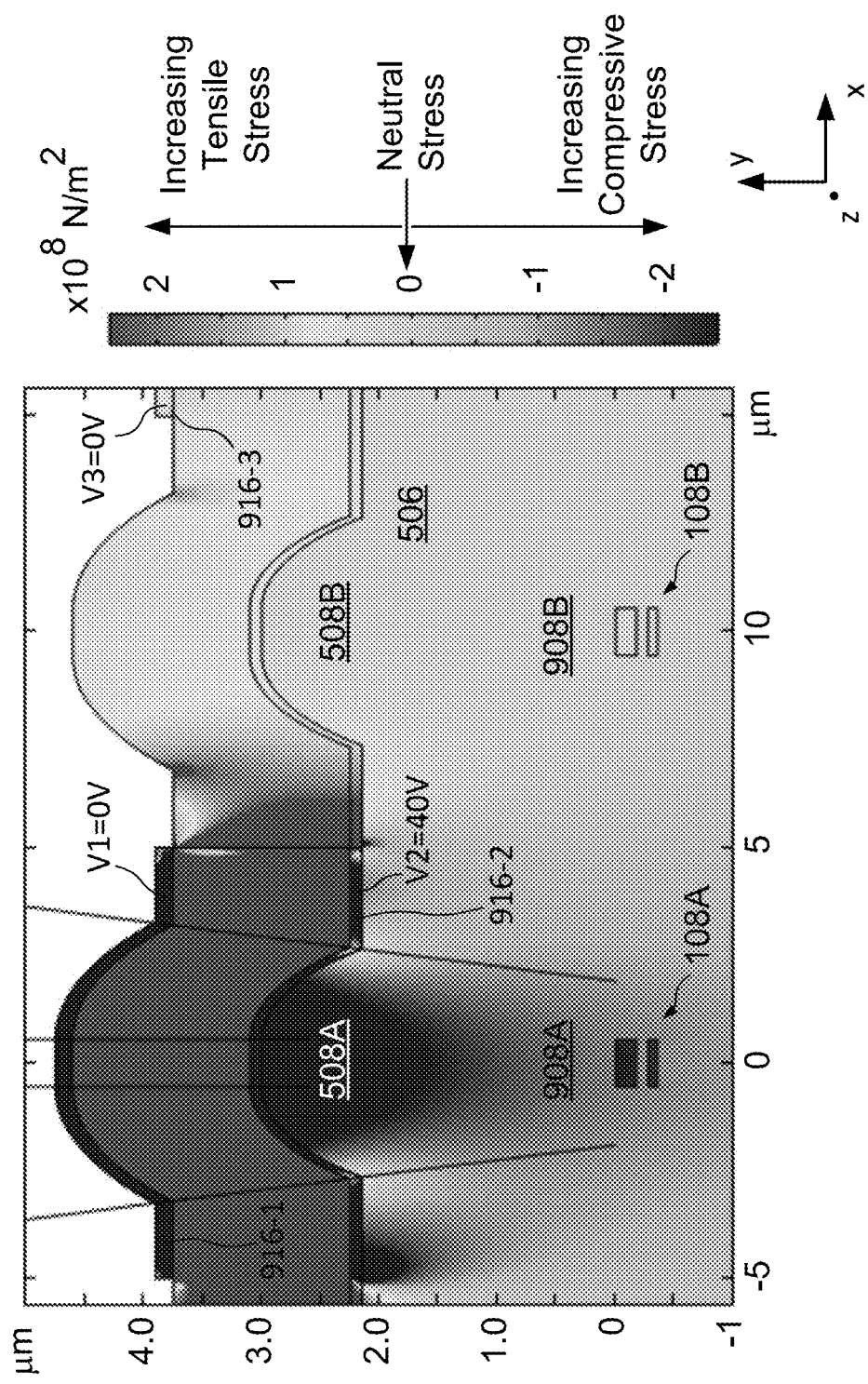
FIGS. 10A-C depict simulations showing the stress fields developed in arms 910A and 910B in response to different voltage configurations applied to electrodes 918-1 through 918-3.
Figure 10B:
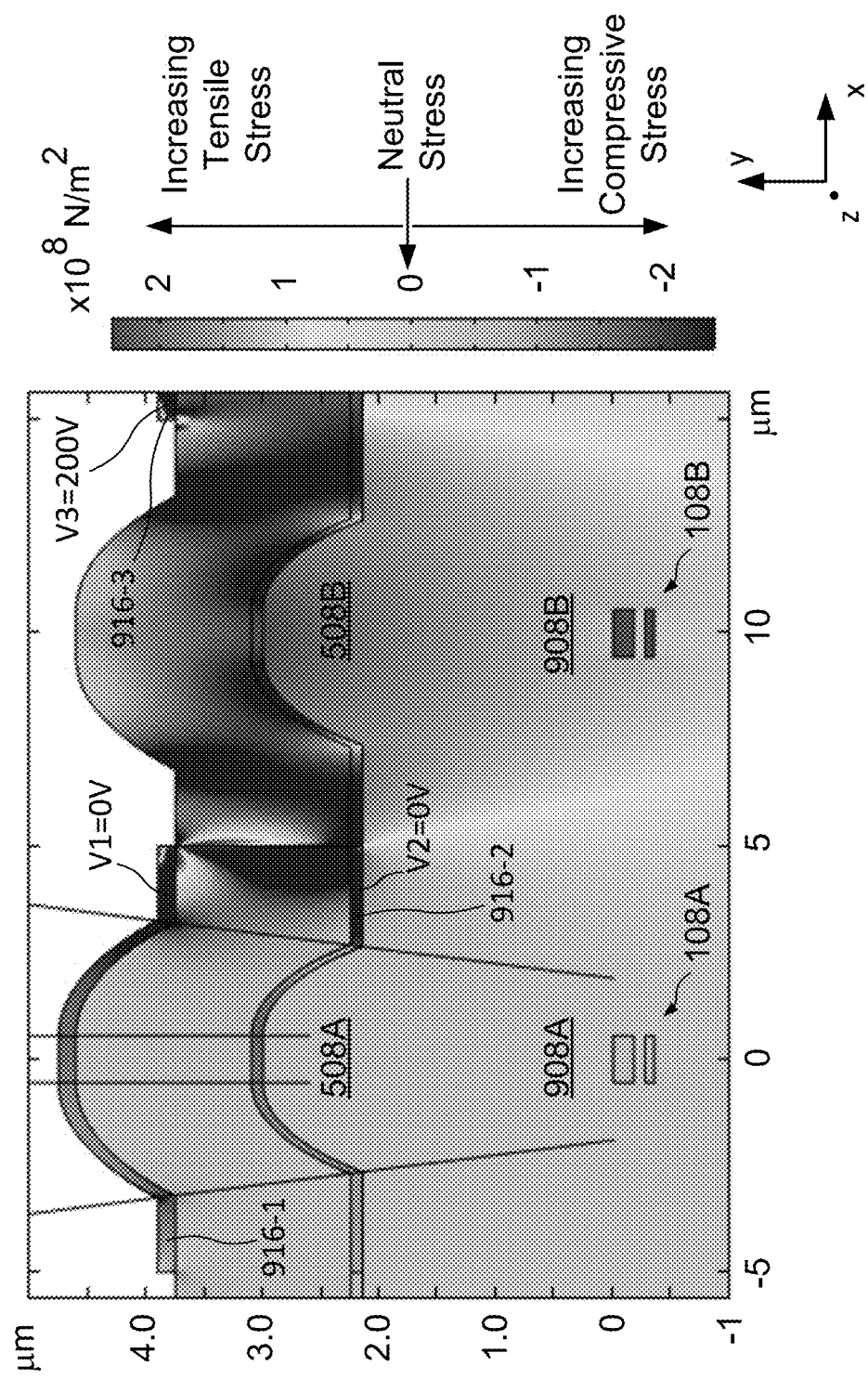
Figure 10C:
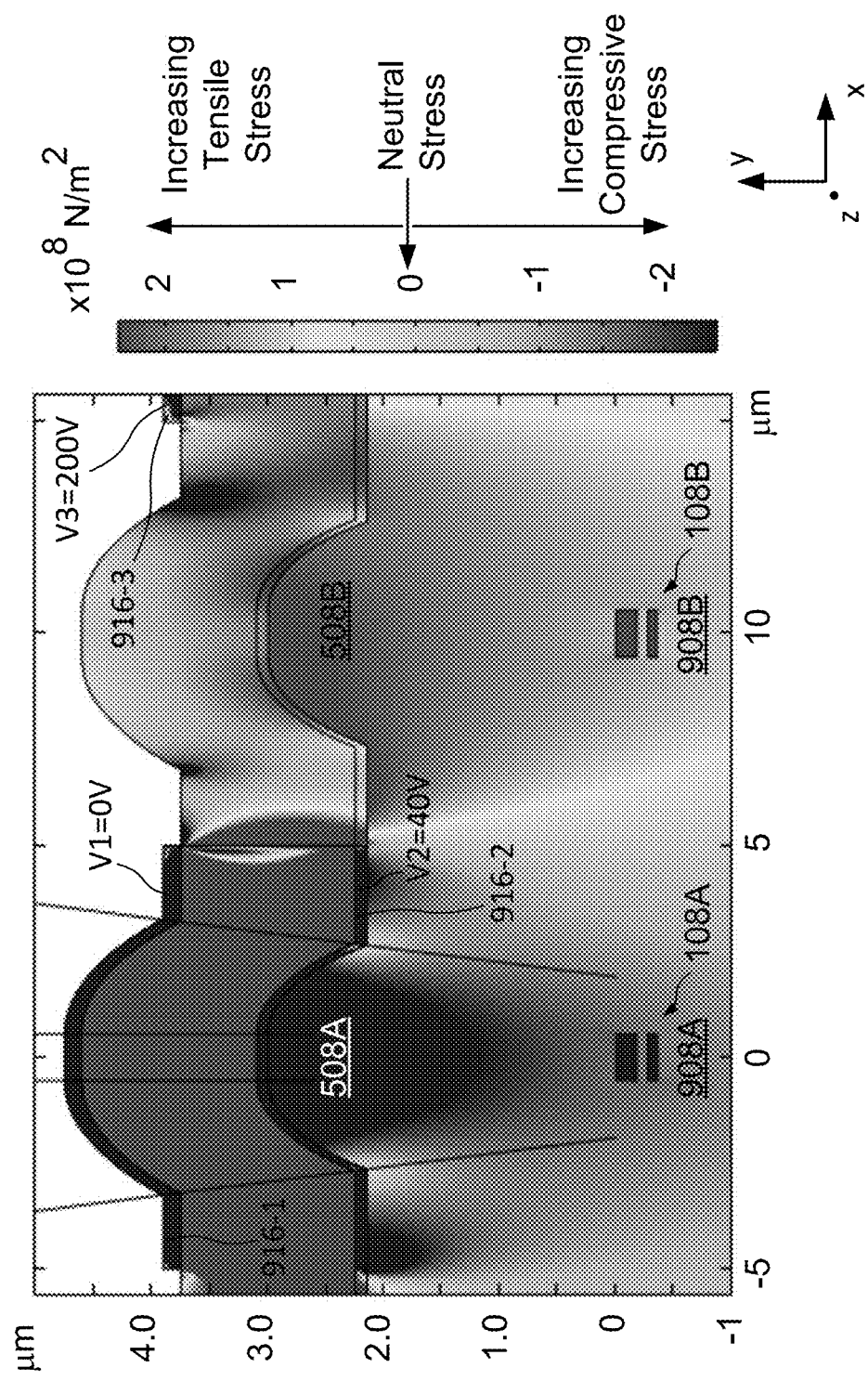

FIGS. 10A-C depict simulations showing the stress fields developed in arms 910A and 910B in response to different voltage configurations applied to electrodes 918-1 through 918-3.

Plot 1000 shows the composite stress fields (combined x-, y-, and z-components) when voltages of 0, 40, and 0 volts are applied to electrodes 918-1, 918-2, and 918-3, respectively.

Plot 1002 shows the composite stress fields when voltages of 0, 0, and 200 volts are applied to electrodes 918-1, 918-2, and 918-3, respectively.

Plot 1004 shows the composite stress fields when voltages of 0, 40, and 200 volts are applied to electrodes 918-1, 918-2, and 918-3, respectively.

As is clear from plot 1004, large-magnitude stresses having opposite sign can be induced in arms 910A and 910B.

It should be noted that the stress-inducing effect of each SOPC element is substantially restricted to the waveguide arm for which it is intended, and with a 10-20% opposite stress at larger distances from the main electrode area. As a result, the phase changes induced in each arm can be increased by adding the two elements together. This is indicated in Table 2 below, where $0.4\pi$ can be added to yield a total simulated phase shift of $3.2\pi$ in the top-bottom configuration; or a $-0.8\pi$ to the top-top configuration for a total of $-2.9\pi$.

TABLE 2

Phase change induced on light portions 914A and 914B for actuation of only SOPC element 916A, only SOPC element 916B alone, and both of SOPC elements 916A and 916B.

| Device | Phase Change V1 = V3 = 0 V, V2 = 40 V | Phase Change V1 = V2 = 0 V, V3 = 200 V | Phase Change V1 = 0 V, V2 = 40 V, V3 = 200 V |
|---|---|---|---|
| 914A | $2.8\pi$ | $0.4\pi$ | $3.2\pi$ |
| 914B | $-0.8\pi$ | $-2.1\pi$ | $-2.9\pi$ |

It is another aspect of the present disclosure that an SOPC element can develop fields of opposite stress at points that are separated by a medium-to-large distance.

Figure 10D:
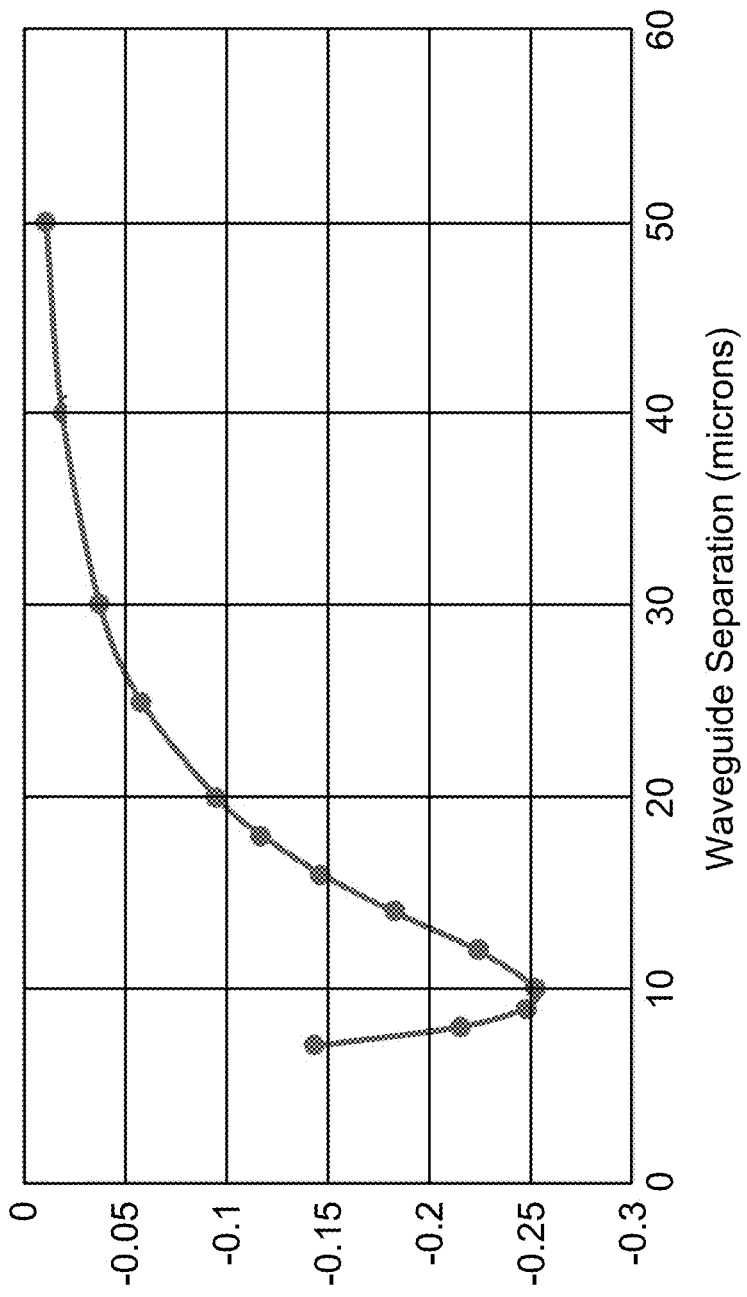
FIG. 10D depicts a simulation showing the phase shift induced on light portion 914B in arm 910B in response to a voltage applied between electrodes 918-1 and 918-2 as a function of the separation distance, d1 between waveguides 910A and 910B.

FIG. 10D depicts a simulation showing the phase shift induced on light portion 914B in arm 910B in response to a voltage applied between electrodes 918-1 and 918-2 as a function of the separation distance, d1 between waveguides 910A and 9106.

Plot 1006 shows that, for this simulation and with a separation of 10 microns between arms 910A and 9106, a phase shift of $-0.25\pi$ develops on light portion 914B in arm 910B due solely to the effect of SOPC element 916A, while actuation of SOPC element 916B contributes an additional 2.6*pi phase shift on light portion 914B.

In some embodiments, laterally displaced fields of opposite stress generated by a single SOPC element are exploited to enable phase control in a photonic circuit. In some embodiments, multiple such SOPC elements are used cooperatively such that the laterally displaced fields of opposite stress from each element collectively develop a desired composite stress configuration.

Furthermore, it is yet another aspect of the present disclosure that the material properties (e.g., Young's modulus, Poisson ratio, etc.) of the materials used in a photonic circuit and/or a SOPC element included in it, can be selected to realize or augment a desired stress configuration. Furthermore, etched or deposited features formed in or laterally displaced from an SOPC element can be used to tailor (or augment) the performance of the element. For example, simulations have shown a 10% increase in phase shift is realized when the piezoelectric material of an SOPC element is removed at a position 2-5 microns away from the waveguide core of a waveguide located under the SOPC element. Non-limiting examples of such configurations include:

i. a capping layer that increases or decreases the effective stress generated by an SPOC element within one or more waveguides; or ii. features (e.g., channels, vias, domes, etc.) formed in and/or laterally displaced from a piezoelectric layer of an SOPC element and/or features formed in one or more layers of a photonic circuit including the SOPC element by removing or adding material; or iii. a combination of i and ii.

It should be noted that photonic circuits comprising cooperative SO phase controllers of different arrangements are within the scope of the present disclosure. For example, in some embodiments, a photonic circuit includes a plurality of SOPC elements having the same electrode configuration (e.g., top-top or top-bottom), where the SOPC elements are configured to operate cooperatively. In some embodiments, the electrodes of a top-bottom SOPC element are independent of the electrodes of a top-top SOPC element with which it cooperatively operates. For example, in some embodiments, piezoelectric layer 512 is not continuous between SOPC elements 916A and 916B and each of the SOPC elements includes a pair of electrodes, none of which is common to both SOPC elements.

As noted above, the application of stress on a waveguide structure via an SOPC element results in high compressive or tensile stress in the waveguide directly under the electrode of the SPOC element, as well as a smaller magnitude stress of the opposite type at a certain distance away from the electrodes. In some embodiments in accordance with the present disclosure, these regions of opposite stress are utilized in an aMZI configuration by locating one arm of the aMZI a stress field having a first sign (e.g., tensile) and the other arm of the aMZI in the stress field sign of the opposite sign (e.g., compressive).

Figure 11A:
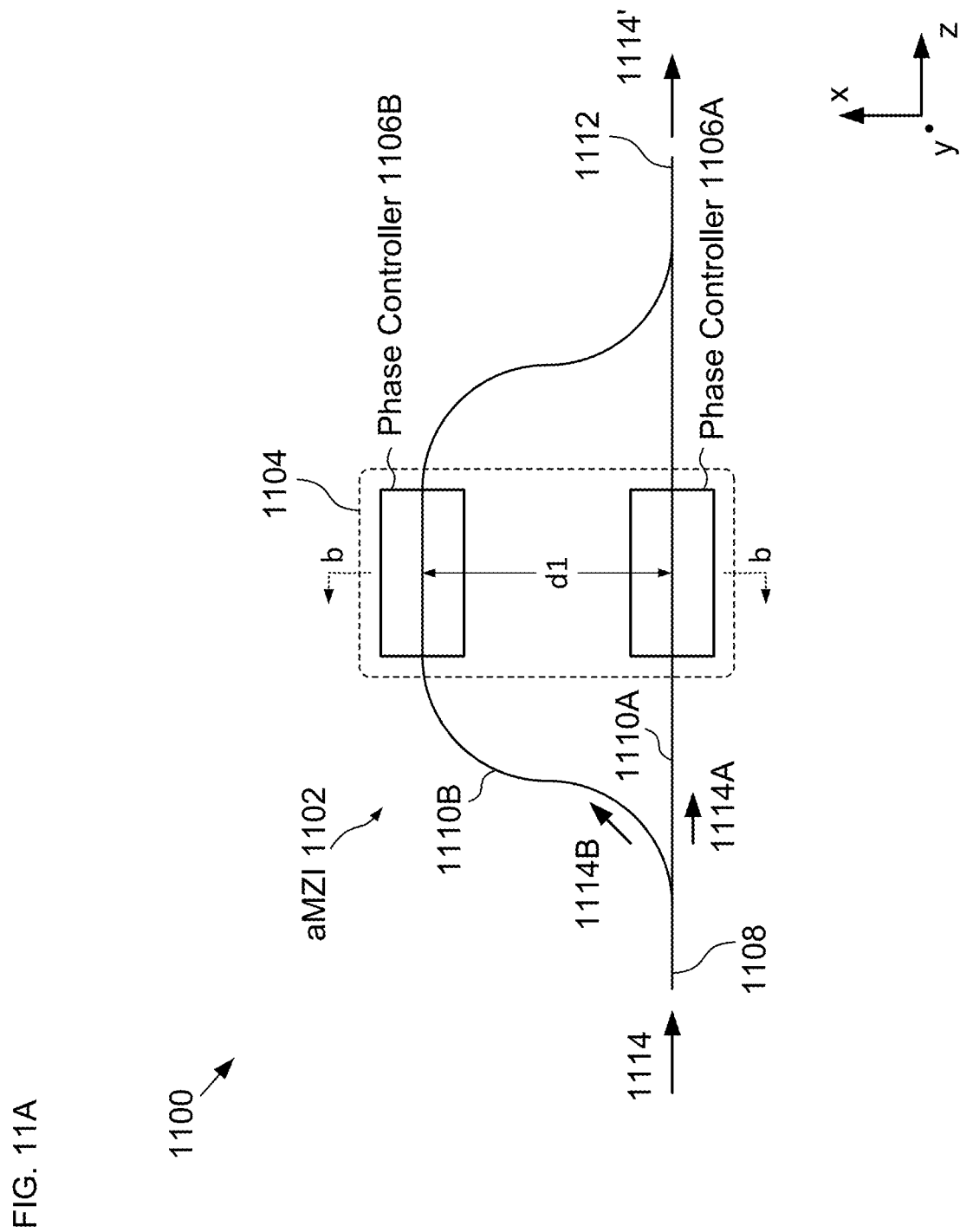
FIG. 11A depicts a schematic drawing of a top view of an alternative PLC-based optical switch in accordance with the present disclosure.

FIG. 11A depicts a schematic drawing of a top view of an alternative PLC-based optical switch in accordance with the present disclosure. PLC 1100 includes asymmetric Mach-Zehnder interferometer (aMZI) 1102 and phase-control module 1104, which are arranged to define an integrated-optics waveguide switch in which the intensity of a light signal is controlled by phase-control module 1104 as the light signal passes from the input port of aMZI 1102 to the output port of aMZI 1102.

Figure 11B:
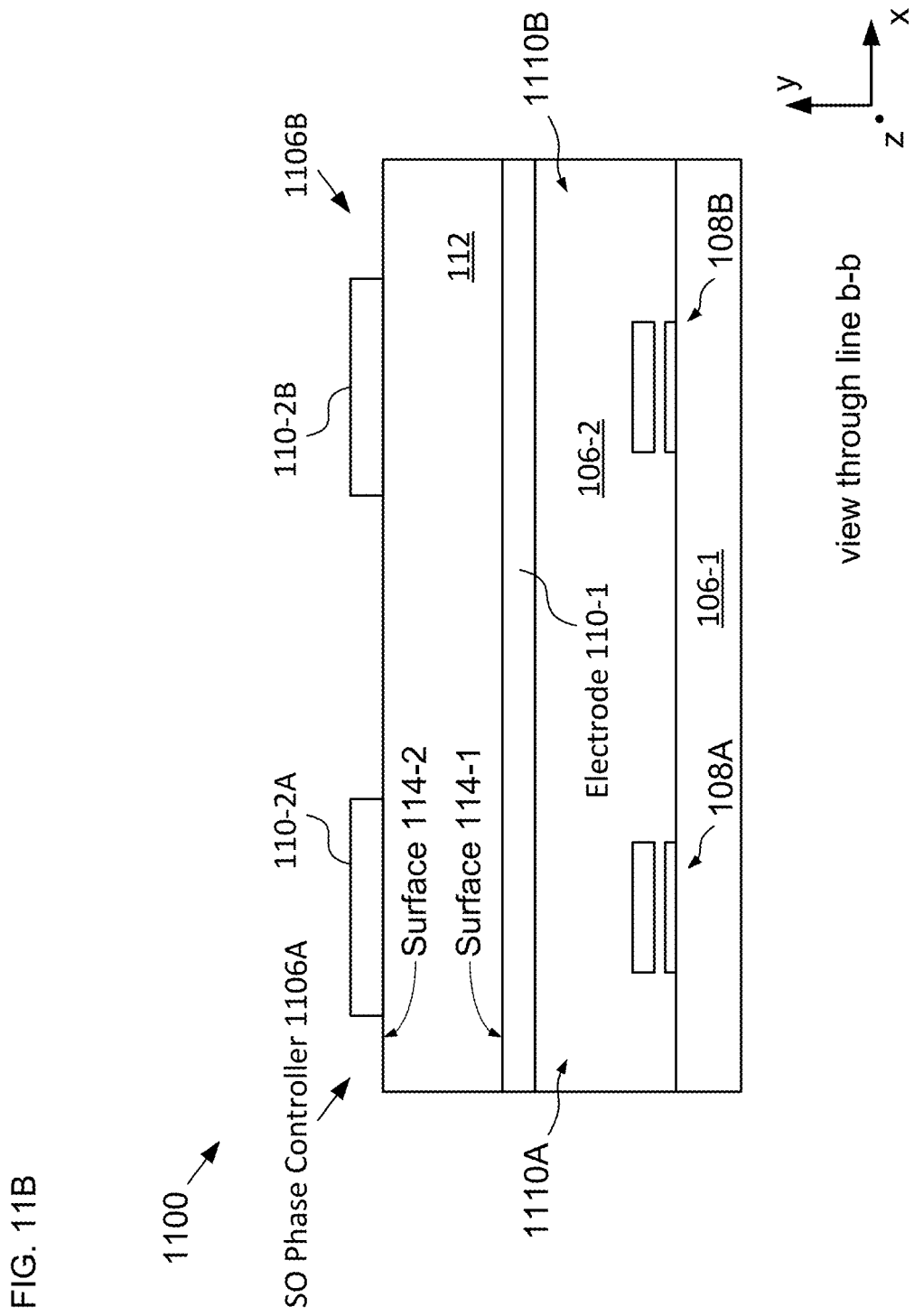
FIG. 11B depicts a schematic drawing of a sectional view of phase-control module 1104.

FIG. 11B depicts a schematic drawing of a sectional view of phase-control module 1104. The sectional view shown in FIG. 11B is taken through line b-b shown in FIG. 11A.

aMZI 1102 includes a network of waveguides that are analogous to those of aMZI 902; however, the waveguides aMZI 1102 have a planar top cladding (i.e., the top cladding does not include a dome).

Phase-control module 1104 includes SO phase controllers 1106A and 1106B, each of which is analogous to SO phase controller 100, described above and with respect to FIG. 1. SO phase controllers 1106A and 1106B are optically coupled with arms 1110A and 1110B, respectively.

Figure 12:
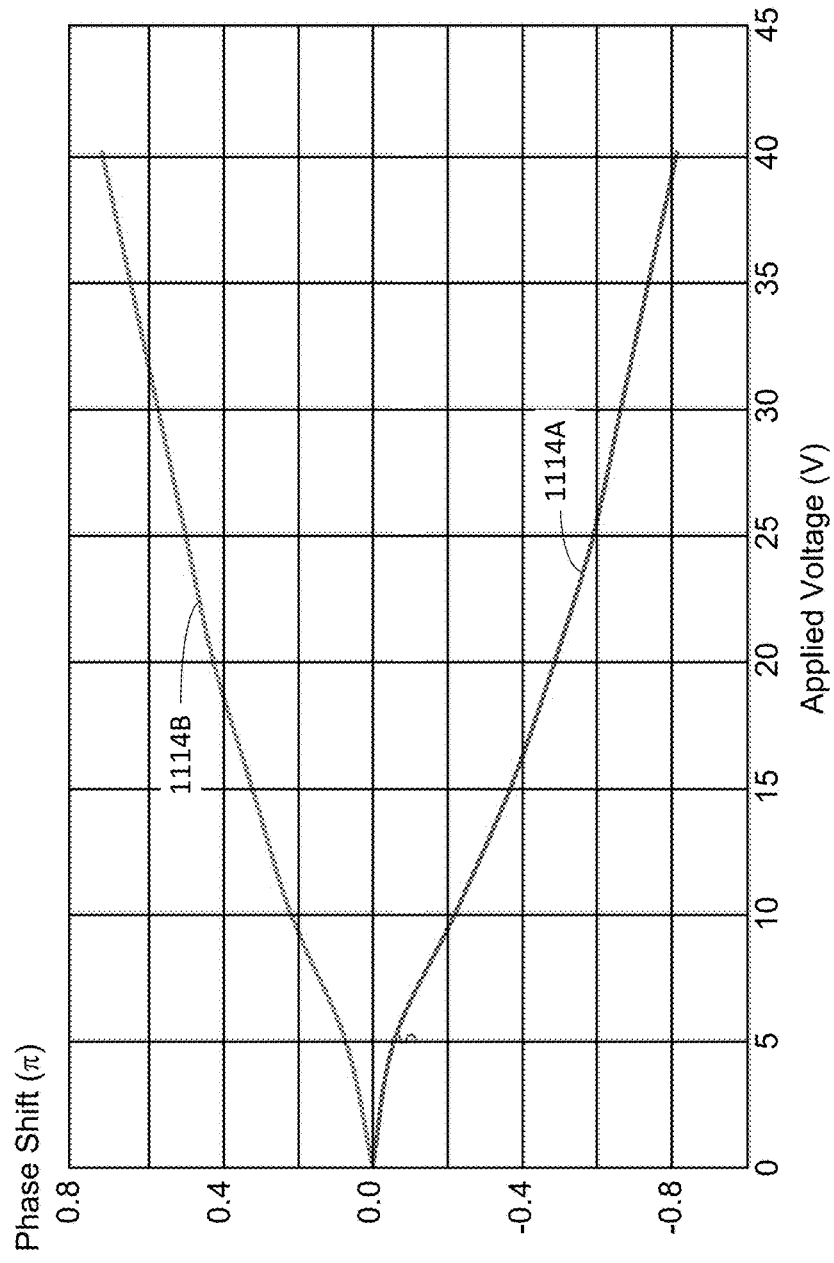
FIG. 12 depicts a plot of the phase changes in light portions 1114A and 1114B induced by the actuation of SO phase controllers 100A and 110B.

FIG. 12 depicts a plot of the phase changes in light portions 1114A and 1114B induced by the actuation of SO phase controllers 1106A and 1106B.

Plot 1200 demonstrates that a phase change of $0.8\pi$ can be realized for the optical signals propagating in each arm for an applied voltage of only 40 V.

In some embodiments, the voltages applied to SO phase controllers 1106A and 1106B are generated in sequence to account for any cancellation of stress effect caused by the voltage applied to the other SO phase controller. In other words, a voltage is first applied to SO phase controller 1106A while SO phase controller 1106B has no voltage applied, which enables a full phase shift differential to be realized on the signals propagating in the two arms.

Figure 13:
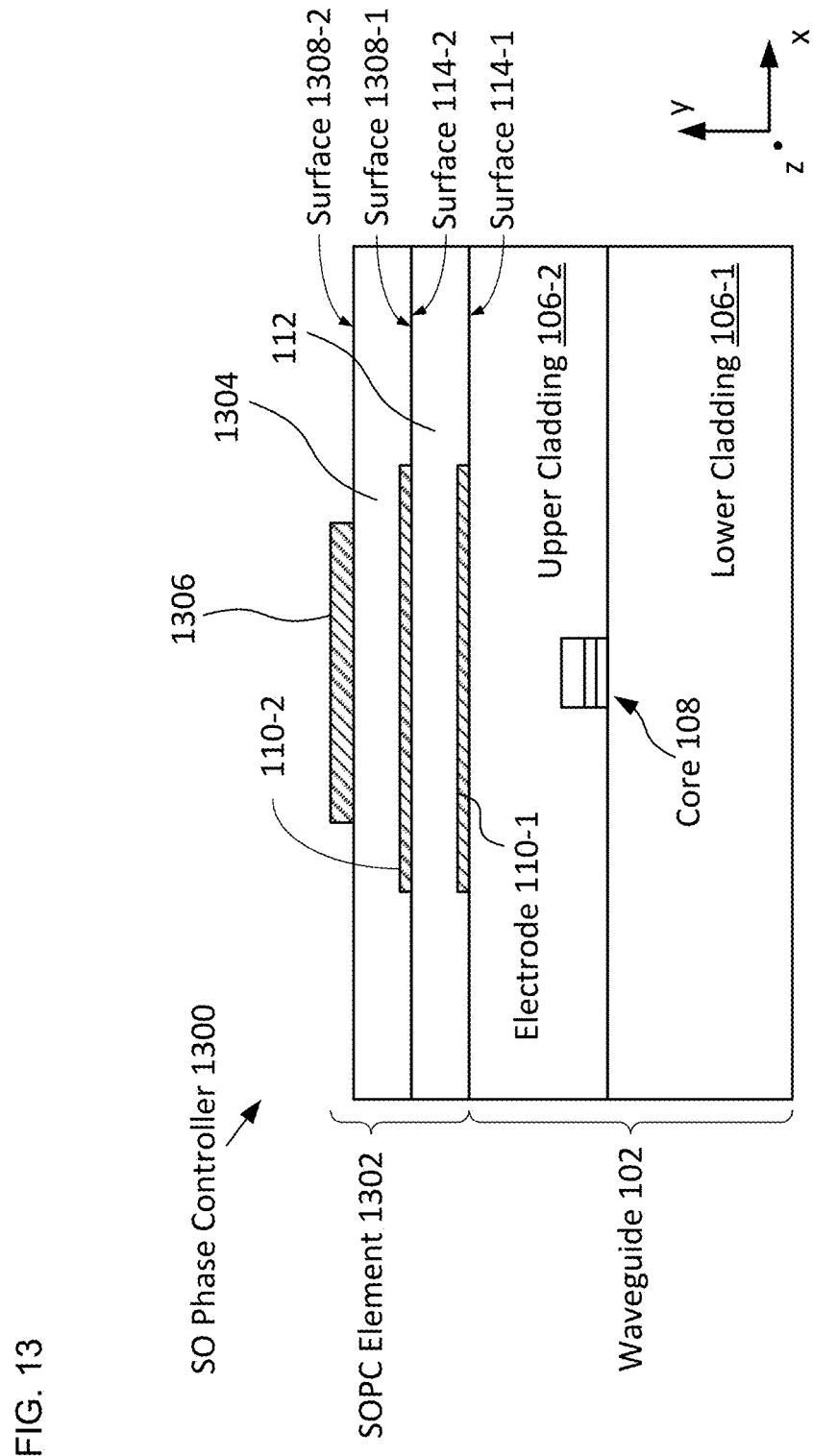
FIG. 13 depicts a schematic drawing of a sectional view of another alternative SO phase controller in accordance with the present disclosure.

FIG. 13 depicts a schematic drawing of a sectional view of another alternative SO phase controller in accordance with the present disclosure. SO phase controller 1300 includes waveguide 102 and SOPC element 1302. It should be noted that SO phase controller 1300 is suitable for use in any embodiment in accordance with the present disclosure.

SOPC element 1302 is analogous to SOPC element 104; however, SOPC element 1302 includes one or more additional piezoelectric layers and interleaving electrodes that collectively define a piezoelectric stack disposed on waveguide 102. In the depicted example, SOPC element 1302 includes one additional piezoelectric layer 1304 and one additional electrode (i.e., electrode 1306). It should be noted that, although SOPC element 1302 is disposed on planarized waveguide 102, in some embodiments, SOPC element 1302 is disposed on a domed waveguide, such as waveguide 502.

Piezoelectric layer 1304 includes bottom surface 1308-1 and top surface 1308-2 and is disposed on piezoelectric layer 112 and electrode 110-1. As a result, electrode 110-1 is in physical and electrical contact with both of surfaces 114-2 and 1308-1.

Electrode 1306 is disposed on piezoelectric layer 1304 such that it is in physical and electrical contact with surface 1308-2.

As will be apparent to one skilled in the art, the piezoelectric effect works as displacement/applied voltage, regardless of the thickness of the piezoelectric layer. In other words, the amount of displacement, and by near linear scaling the stress on the waveguides, depends only on the voltage across the piezoelectric material.

It is an aspect of the present disclosure that the magnitude of stress induced in a waveguide by an SOPC element disposed on it can be multiplied by the number of piezoelectric layers it includes. In other words, the exemplary SOPC element 1302 includes a stack of two piezoelectric layers that includes substantially identical piezoelectric layers 112 and 1304, so the amount of stress it can induce in waveguide 102 in response to control signals applied to electrodes 110-1, 110-2, and 1306 is substantially twice that of SOPC element 104. In some embodiments, more than two piezoelectric layers are included in an SOPC element.

It should be noted that the breakdown voltage for a piezoelectric layer is based on its thickness, which can limit the total amount of stress that can be induced by an SOPC element.

It is yet another aspect of the present disclosure that the design of the electrodes of an SOPC element can have dramatic effect on the effectiveness with which it can induce stress in an underlying waveguide structure.

Figure 14:
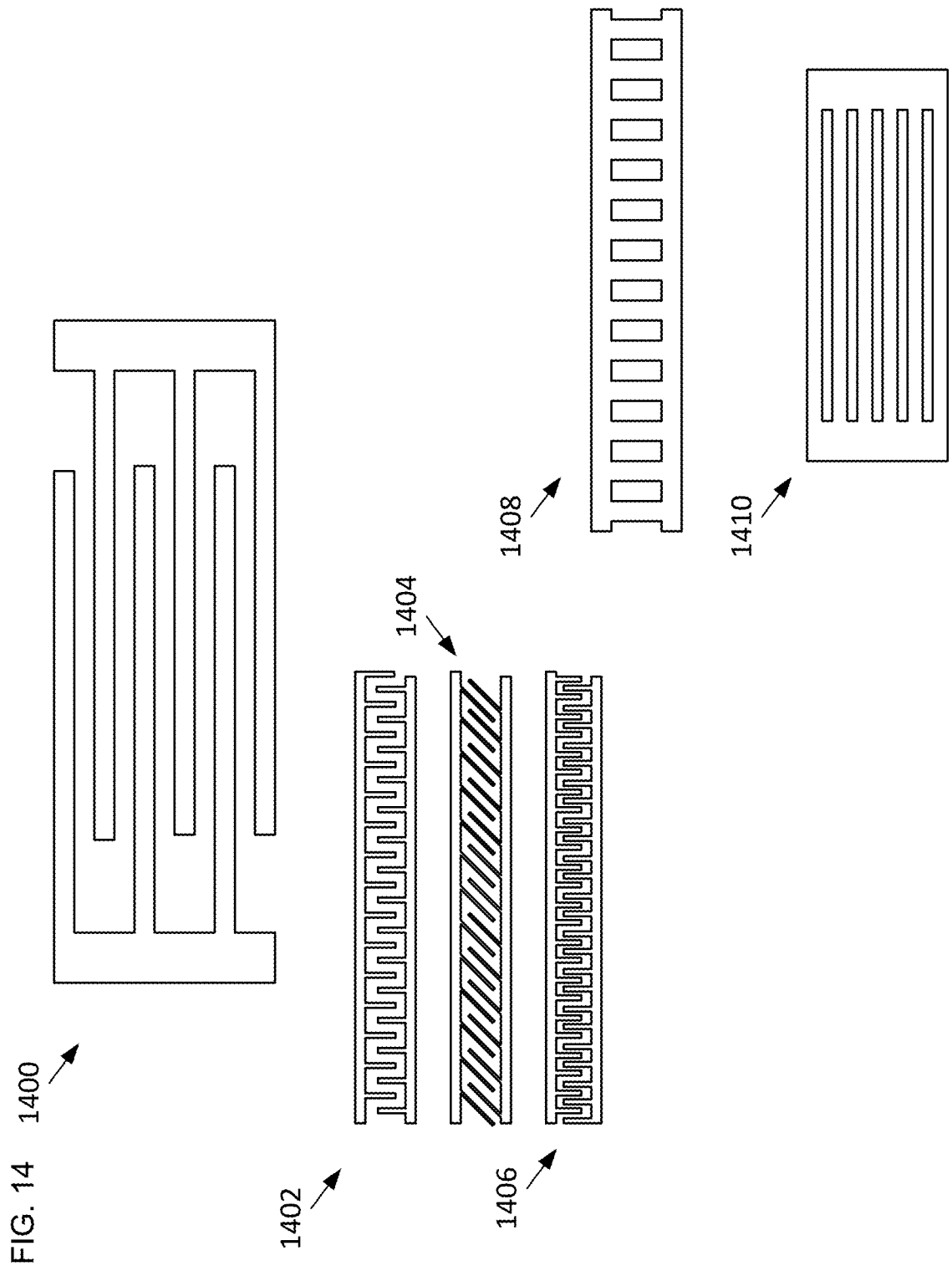
FIG. 14 depicts a schematic drawing of top view of non-limiting examples of electrode shapes in accordance with the present disclosure.

FIG. 14 depicts a schematic drawing of top view of non-limiting examples of electrode shapes in accordance with the present disclosure.

Electrode patterns 1400 through 1410 are particularly well suited for use in SOPC elements having a top-top electrode configuration; however, SOPC elements having a top-bottom electrode configuration can also benefit from employing split electrodes in at least one electrode level. For example, a split electrode includes greater edge length, at which large stress can be induced since it is the boundary between where a piezoelectric layer can and cannot expand.

In some embodiments, the orientation of an electrode is not aligned with the axis of the waveguide beneath it.

It is to be understood that the disclosure teaches just one example of the illustrative embodiment and that many variations of embodiments in accordance with the present disclosure can easily be devised by those skilled in the art after reading this disclosure and that the scope of the present invention is to be determined by the following claims.

What is claimed is:

1. An apparatus comprising a planar lightwave circuit (900) including:
   a first surface waveguide (910B) that includes a first core (108B) and a first cladding (506) that is at least partially disposed on the first core; and
   a phase-control module (904) that includes a first stress-optic phase-control (SOPC) element (916B) comprising:
   (i) a first piezoelectric layer (512) disposed on the first cladding, the first piezoelectric layer having a first surface (516-1) that is proximal to the first cladding and a second surface (516-2) that is distal to the first cladding;
   (ii) a first electrode (918-1); and
   (iii) a second electrode (918-3), wherein the first electrode is in physical and electrical contact with the second surface; and the second electrode is in physical and electrical contact with the second surface;
   a second surface waveguide (910A) that includes a second core (108A), wherein the first cladding is at least partially disposed on the second core; and
   a second SOPC element (916A) comprising:
   (i) the first piezoelectric layer;
   (ii) the first electrode (918-1); and
   (iii) a third electrode (918-2), wherein the first piezoelectric layer (512) is between the first and third electrodes and the third electrode is in physical and electrical contact with the first surface (516-1); and
   wherein the phase-control module is configured to induce a first stress in the first surface waveguide in response to a first control signal (CSB) applied to the first and second electrodes, and is also configured to induce a second stress in the second surface waveguide when a second control signal (CSA) is applied to the first and third electrodes.

2. The apparatus of claim 1 wherein the first cladding includes a first dome (508B) and the first piezoelectric layer includes a first arc (514B), and wherein the first arc is located between the first and second electrodes.

3. The apparatus of claim 1 wherein the second electrode (918-3) is in physical and electrical contact with the second surface (516-2).

4. The apparatus of claim 1 wherein the first cladding includes a first dome (508A) and the first piezoelectric layer includes a first arc (514A), and wherein the first arc is disposed on the third electrode (918-2) and the first arc is between the first electrode (918-1) and the third electrode (918-2).

5. The apparatus of claim 4 wherein the first cladding includes a second dome (508B) and the first piezoelectric layer includes a second arc (514B), and wherein the second arc is between the first electrode (918-1) and the second electrode (918-3).

6. The apparatus of claim 1 wherein the apparatus further includes:
   a planar-lightwave circuit (PLC) (900) that includes a Mach-Zehnder Interferometer (MZI) (902) comprising the first surface waveguide, the second surface waveguide, an input port (908) for receiving a first light signal (914), and an output port (912) for providing a second light signal (914') that is based on the first light signal, wherein the intensity of the light signal at the output port is based on the magnitudes of the first stress and second stress.

7. A method comprising:
   providing a first surface waveguide (910B) that includes a first core (108B) and a first cladding (506) that is at least partially disposed on the first core;
   providing a phase-control module (904) that includes a first stress-optic phase-control (SOPC) element (916B) that is operatively coupled with the first surface waveguide, the first SOPC element comprising:
   (i) a first piezoelectric layer (512) disposed on the first cladding, the first piezoelectric layer having a first surface (516-1) that is proximal to the first cladding and a second surface (516-2) that is distal to the first cladding;
   (ii) a first electrode (918-1); and
   (iii) a second electrode (918-3), wherein the first electrode is in physical and electrical contact with the second surface, and the second electrode is in physical and electrical contact with one of the first surface and second surface; and
   providing a second surface waveguide (910A) that includes a second core (108A), wherein the first cladding is at least partially disposed on the second core;
   providing the phase-control module (904) such that it includes a second SOPC element (916A) comprising:
   (i) the first piezoelectric layer;
   (ii) the first electrode (918-1); and
   (iii) a third electrode (918-2), wherein the first piezoelectric layer (512) is between the first and third electrodes and the third electrode is in physical and electrical contact with the first surface (516-1);
   wherein the phase-control module is configured to induce a first stress in the first surface waveguide in response to a first control signal (CSB) applied to the first and second electrodes, and also configured to induce a second stress in the second surface waveguide when a second control signal (CSA) is applied to the first and third electrodes;
   enabling propagation of a first light signal (914B) through the first waveguide, and a second light signal (914A) through the second waveguide; and
   controlling a first phase of the first light signal by controlling the first control signal, and a second phase of the first second signal by controlling the second control signal.

8. The method of claim 7 wherein the phase-control module (904) is provided such that the first cladding includes a first dome (508B) and the first piezoelectric layer includes a first arc (514B), and wherein the first arc is located between the first and second electrodes.

9. The method of claim 7 wherein the method further includes
   providing a planar-lightwave circuit (PLC) (900) that includes:
   the first and second waveguides;
   an input port (908) that is optically coupled with each of the first and second waveguides; and an output port (912) that is optically coupled with each of the first and second waveguides;

wherein the input port splits an input light signal (914) into the first light signal and the second light signal, the output port combines the first and second light signals into an output light signal (914'), and wherein the magnitude of the output light signal is based on the first phase and second phase.

\* \* \* \* \*